(12) United States Patent
Alkhalaf et al.

(10) Patent No.: US 11,970,423 B2
(45) Date of Patent: Apr. 30, 2024

(54) HYDROCARBOXYLIC ACID DERIVATIVE AS A RETARDER ADDITIVE FOR OIL AND GAS WELLS CEMENTING

(71) Applicant: Saudi Arabian Oil Company, Dhahran (SA)

(72) Inventors: Sara Abdulaziz Alkhalaf, Al Khobar (SA); Abdullah Al-Yami, Dhahran (SA); Vikrant Wagle, Abqaiq (SA); Ali Al Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/543,991

(22) Filed: Dec. 7, 2021

(65) Prior Publication Data
US 2023/0219847 A1 Jul. 13, 2023

(51) Int. Cl.
| | | |
|---|---|---|
| *E21B 43/34* | (2006.01) | |
| *C04B 7/32* | (2006.01) | |
| *C04B 12/04* | (2006.01) | |
| *C04B 24/06* | (2006.01) | |
| *C04B 40/06* | (2006.01) | |
| *C09K 8/467* | (2006.01) | |
| C04B 103/22 | (2006.01) | |

(52) U.S. Cl.
CPC .............. *C04B 24/06* (2013.01); *C04B 7/32* (2013.01); *C04B 12/04* (2013.01); *C04B 40/06* (2013.01); *C09K 8/467* (2013.01); *C04B 2103/22* (2013.01)

(58) Field of Classification Search
CPC ................ C09K 8/467; E21B 43/34

USPC ......................................................... 166/293
See application file for complete search history.

(56) References Cited

U.S. PATENT DOCUMENTS

| | | |
|---|---|---|
| 3,753,748 A | 8/1973 | Martin |
| 4,504,317 A | 3/1985 | Smeltzer et al. |
| 5,411,092 A | 5/1995 | Cowan |
| 5,503,672 A | 4/1996 | Barlet-Gouedard et al. |
| 6,173,778 B1 | 1/2001 | Rae et al. |
| 6,511,537 B1 | 1/2003 | Barlet-Gouedard et al. |
| 6,907,928 B2 * | 6/2005 | Di Lullo Arias ....... C04B 28/04 106/789 |
| 7,857,053 B2 | 12/2010 | Michaux et al. |
| 8,550,162 B2 | 10/2013 | Michaux et al. |

(Continued)

FOREIGN PATENT DOCUMENTS

CN 106145743 A 11/2016

*Primary Examiner* — Zakiya W Bates
*Assistant Examiner* — Ashish K Varma
(74) *Attorney, Agent, or Firm* — DINSMORE & SHOHL LLP

(57) ABSTRACT

Cement compositions of the present disclosure include a cement precursor, water, and a cement retarder that includes hydrocarboxylic acid derivatives. In particular, the cement compositions include from 10 wt. % to 70 wt. % cement precursor, from 5 wt. % to 70 wt. % water, and from 0.1 percent by weight of cement (BWOC) to 10 percent BWOC cement retarder comprising the hydrocarboxylic acid derivatives. The hydrocarboxylic acid derivatives provide increased thickening time to the cement compositions at downhole temperatures of greater than or equal to 50° C. The present disclosure further includes methods of cementing a wellbore using the cement compositions with the cement retarder comprising the hydrocarboxylic acid derivatives.

19 Claims, 15 Drawing Sheets

(56) References Cited

U.S. PATENT DOCUMENTS

| | | | |
|---|---|---|---|
| 8,551,240 B2* | 10/2013 | Michaux | C04B 40/0039 |
| | | | 106/726 |
| 9,410,072 B2 | 8/2016 | Scoggins | |
| 9,932,269 B2 | 4/2018 | Zubrod | |
| 9,975,807 B2* | 5/2018 | Michaux | C04B 24/006 |
| 10,196,310 B2 | 2/2019 | Zubrod et al. | |
| 2005/0109507 A1* | 5/2005 | Heathman | E21B 33/13 |
| | | | 106/815 |

* cited by examiner

HYDROCARBOXYLIC ACID DERIVATIVE AS A RETARDER ADDITIVE FOR OIL AND GAS WELLS CEMENTING

TECHNICAL FIELD

Embodiments of the present disclosure generally relate to natural resource well drilling and, more specifically, to cement compositions for wellbore cementing.

BACKGROUND

Extracting hydrocarbons from subterranean hydrocarbon sources may require drilling a hole from the surface to the subterranean geological formation containing the hydrocarbons. Specialized drilling techniques and materials are utilized to form the wellbore hole and extract the hydrocarbons. Specialized materials utilized in drilling operations include materials for sealing the casing-casing annulus between two tubular strings installed in the wellbore. Such specialized materials may also be formulated for specific downhole conditions. These specialized materials may also be used in wellbore remediation and for treating subterranean formations, such as treating lost circulation zones or water zone remediation.

A wellbore is a hole that extends from the surface to a location beneath the surface to permit access to hydrocarbon-bearing subterranean formations. The wellbore contains at least a portion of a fluid conduit that links the interior of the wellbore to the surface. The fluid conduit coupling the interior of the wellbore to the surface may be capable of permitting regulated fluid flow from the interior of the wellbore to the surface. The fluid conduit may also permit access between equipment on the surface and the interior of the wellbore. The fluid conduit may be defined by one or more tubular strings, such as wellbore casings for example, inserted into the wellbore and secured in the wellbore.

SUMMARY

The tubular strings forming the fluid conduit may have at least two openings (typically on opposing ends) with an enclosing wall having an interior surface and an exterior surface. The interior surface defines the fluid conduit. Examples of tubular strings and portions of tubular strings used in the wellbore as fluid conduits or for making or extending fluid conduits include casings, production liners, coiled tubing, pipe segments, tubes, pipe strings, mechanical structures with interior voids, or combinations of these. A tubular string may include an assembly of several shorter tubular strings connected to one another, such as joined pipe segments or casings.

When positioned in the wellbore, the exterior surfaces of the tubular string and the internal wall of the wellbore define a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material, such as a cement, in the wellbore annulus or the casing-casing annulus to seal the annulus.

Primary sealing refers to the process of initially sealing the annulus upon installation of the tubular string in the wellbore. Primary sealing may refer to initial sealing of the annulus between the exterior surface of the tubular string and the wellbore wall of the wellbore or initial sealing of a casing-casing annulus. Primary sealing in wellbore installations may be performed with wellbore cement and, thus, may be commonly referred to as "primary cementing." Primary sealing or cementing forms a protective solid sheath around the exterior surface of the tubular string. Wellbore cements may be also be used to treat lost circulation zones of wellbores or for treating subterranean formations, such as conducting water shut off techniques.

The wellbore cements commonly used for cementing tubular strings in wellbores or remediating lost circulation zones often include a mixture of metal oxides. In particular, cements for wellbore cementing application may include silicates, such as tricalcium silicate ($Ca_3SiO_5$) and dicalcium silicate ($Ca_2SiO_4$), as well as tricalcium aluminate ($3CaO \cdot Al_2O_3$) and tetracalcium alumina ferrite ($C_4AF$). In addition, gypsum may be added to control the setting time of cement. The cement may be combined with water to produce a slurry, which is then pumped downhole for primary cementing or for treatment of a subterranean formation. During curing of the cement, constituents of the wellbore cements undergo hydration through contact with the water and other reactions that cure the cement into a rigid solid. In particular, upon contact with water, the gypsum in the cement partially dissolves releasing calcium and sulphate ions to react with the aluminate and hydroxyl ions produced by the tricalcium aluminate (C3A) to form a calcium trisulphoaluminate hydrate, which may be known as the mineral Ettringite ($Ca_6Al_2(SO_4)_3(OH)_{12} \cdot 26H_2O$ (abbreviated C3A·3CS·32H)). The trisulpho-aluminate hydrate precipitates onto the surfaces of the tricalcium aluminate (C3A), which may prevent further rapid hydration (flash-set) of the tricalcium aluminate. The gypsum is gradually consumed and Ettringite continues to precipitate until the gypsum is consumed. The sulphate ion concentration decreases and the ettringite will become unstable converting to calcium monosulphoaluminate hydrate. The remaining unhydrated tricalcium aluminate will form calcium aluminate hydrate.

Cement slurry design is based on the altering or inhibition of the hydration reactions with specific additives. Cement must be designed in a way to ensure acceptable properties such as mix ability, stability, rheology, fluid loss, and adequate thickening time. Cement retarders are cement additives whose function is to retard, or delay the setting of cement slurries. For a wellbore with a downhole temperature of 125 degrees Fahrenheit (° F.) (52 degrees Celsius (° C.)) or less, cement retarders are generally not needed. However, as downhole temperature increases, the hydration process of tricalcium silicates increases and, hence, the thickening time decreases. At increased temperatures, the thickening time may not be sufficient to deploy the cement composition before thickening of the cement makes the cement unpumpable. In addition to retarder additives which can be added to cements, retarded cements are available that have an increased setting time compared to normal cements without the use of cement retarders. These retarded cements can contain lignin, gums, starches, or other compounds that increase the setting time of the retarded cement. However, these retarded cements may not be compatible with cement additives and the setting times may be difficult to control consistently.

Accordingly, ongoing needs exist for cement retarders for reducing the cure rate and increasing the thickening time for wellbore cements. In particular, ongoing needs exist for cement retarders that are compatible with other cement additives and are capable of delaying thickening and setting of wellbore cements at downhole temperatures greater than or equal to 50° C. The cement compositions of present disclosure include a cement retarder comprising a hydrocarboxylic acid derivative. The cement compositions also include a cement precursor and water. The cement retarder comprising the hydrocarboxylic acid derivatives of the present disclosure may be compatible with other wellbore cement additives and may provide retarding of the curing rate and increase in the thickening time of the cement compositions of the present disclosure at downhole temperatures greater than or equal to 50° C.

According one or more aspects of the present disclosure, a cement composition comprises from 10 weight percent to 70 weight percent cement precursor based on the total weight of the cement composition, from 5 weight percent to 70 weight percent water based on the total weight of the cement composition, and from 0.1 percent by weight of cement (BWOC) to 10 percent BWOC cement retarder. The cement retarder may comprise a hydrocarboxylic acid derivative.

Additional features and advantages of the described embodiments will be set forth in the detailed description which follows, and in part will be readily apparent to those skilled in the art from that description or recognized by practicing the described embodiments, including the detailed description which follows as well as the drawings and the claims.

BRIEF DESCRIPTION OF THE DRAWINGS

The following detailed description of specific aspects of the present disclosure can be best understood when read in conjunction with the following drawings, in which like structure is indicated with like reference numerals and in which.

Figure 1:
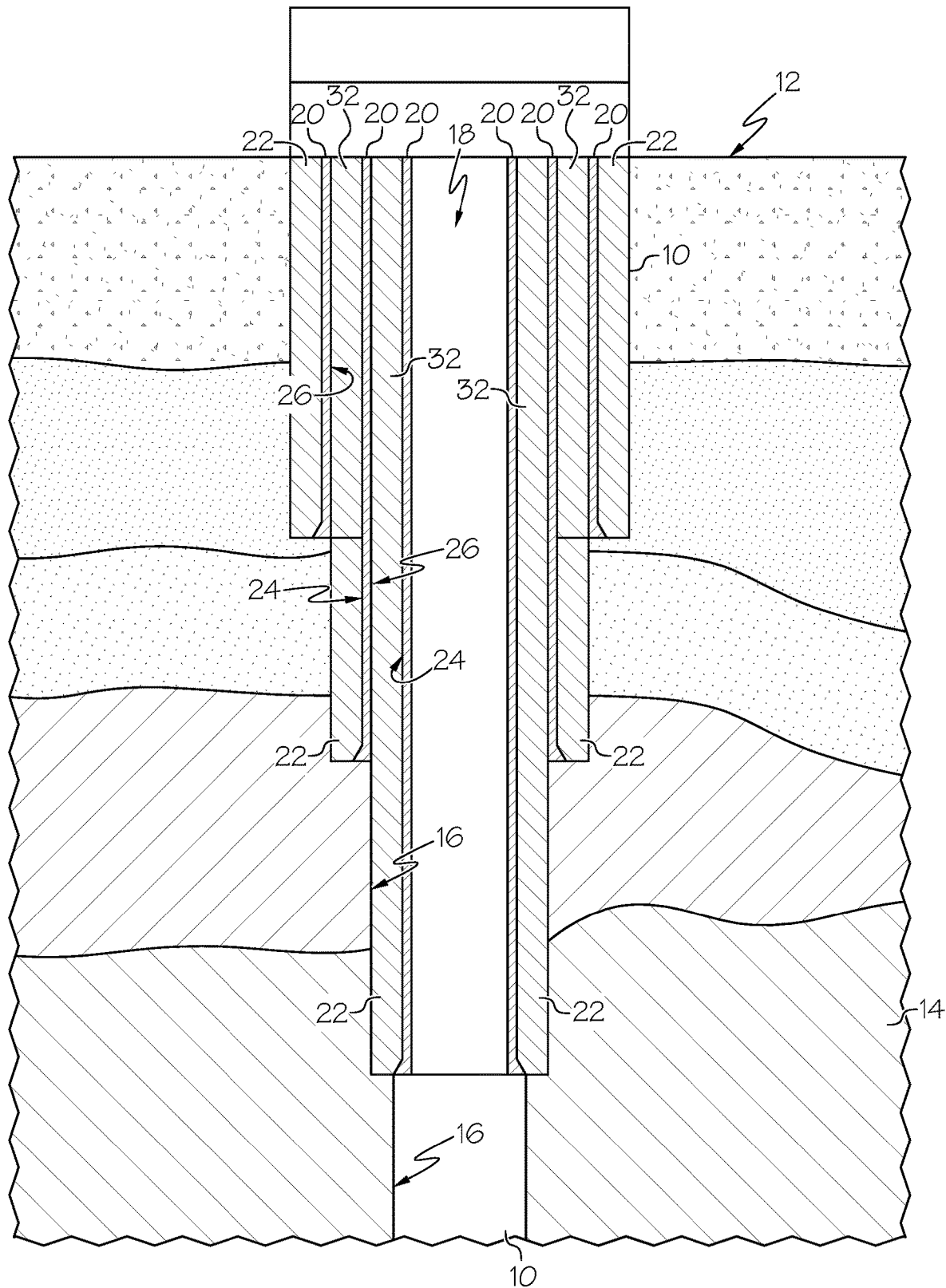
FIG. 1 schematically depicts a plurality of tubular strings installed in a wellbore, according to one or more embodiments shown and described in the present disclosure.

Reference will now be made in greater detail to various aspects of the present disclosure, some aspects of which are illustrated in the accompanying drawings.

DETAILED DESCRIPTION

The present disclosure is directed to cement compositions comprising a cement retarder for delaying the setting time for the cement composition at downhole temperatures greater than or equal to 50° C. The present disclosure is also directed to methods of cementing using the cement compositions. In embodiments of the present disclosure, a cement composition includes from 10 weight percent to 70 weight percent cement precursor based on the total weight of the cement composition, from 5 weight percent to 70 weight percent water based on the total weight of the cement composition, and from 0.1 percent by weight of cement (BWOC) to 10 percent BWOC cement retarder, where the cement retarder comprises hydrocarboxylic acid derivatives. The cement compositions of the present disclosure may have a thickening time or curing time of greater than 4 hours at downhole temperatures of greater than or equal to 50° C., among other features. Methods of using the cement compositions of the present disclosure are also included.

As used throughout this disclosure, the term "hydrocarbon-bearing formation" refers to a subterranean geologic region containing hydrocarbons, such as crude oil, hydrocarbon gases, or both, which may be extracted from the subterranean geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery or reduction of water production.

As used throughout this disclosure, the term "fluid" includes liquids, gases, or both.

As used throughout the present disclosure, the term "spacer fluid" refers to a fluid utilized to maintain separation between any two other materials utilized in well production, such as fluids that may be incompatible with each other, for example.

As used throughout the present disclosure, the term "displacement fluid" refers to a fluid injected into the wellbore to displace a different fluid out of the wellbore and into the annulus or into a portion of the subterranean formation.

As used throughout the present disclosure, the term "cement precursor" refers to any suitable material which, when mixed with water, may be cured into a cement. A cement precursor may be hydraulic or non-hydraulic.

As used throughout this disclosure, the term "cure" or "curing" refers to providing adequate moisture, temperature and time to allow a cement or concrete to achieve the desired properties (such as hardness) for its intended use through one or more reactions between the water and the cement precursor.

As used throughout this disclosure, the term "thickening" refers to an increase in Bearden consistency, which may be caused by curing of the cement compositions of the present disclosure. A "thickening time" may refer to a time during curing at which the cement composition reaches a Bearden Consistency sufficient to cause the cement composition to become unpumpable.

As used throughout this disclosure, the term "unsaturated compounds" refers to cyclic compounds and compounds having to double bonds, triple bonds, or both.

As used throughout the present disclosure, the term "dimer" refers to an oligomer consisting of two monomers joined by bonds that can be either strong or weak bonds, or covalent or intermolecular bonds. The term "homodimer" refers to a dimer in which the two monomers are identical, and the term "heterodimer" refers to a dimer in which the two monomers are different.

As used throughout the present disclosure, the term "trimer" refers to a compound or molecule consisting of three identical simpler molecules.

As used throughout the present disclosure, the term "annulus" refers to the volume defined between the exterior surface of a tubular string and the wellbore wall or an inner surface of another tubular string that surrounds to the tubular string. The term "annulus" may refer to the wellbore annulus, a casing-casing annulus, or both.

As used throughout the present disclosure, the term "by weight of cement" refers to an amount of a constituent of the cement composition relative to the amount of the cement precursor in the cement composition and can be calculated by dividing the weight of the constituent by the total weight of the cement precursor in the cement composition and then multiplying by 100%. "By weight of cement" may be abbreviated using the acronym BWOC.

As used throughout the present disclosure, the term "substantially free" of a constituent in the cement composition means that the cement composition includes less than 1% BWOC of that constituent, unless otherwise stated. When used outside the context of the cement composition, the term "substantially free" of a constituent refers less than 0.1 weight percent (wt. %) of that component in a composition, unless otherwise stated. For example, a cement retarder that is substantially free of chloride may have less than 0.1 wt. % chloride based on the total weight of the cement retarder, unless stated otherwise.

Referring to FIG. 1, a wellbore 10 having a plurality of tubular strings 20 installed in the wellbore 10 is schematically depicted. The wellbore 10 forms a pathway capable of permitting both fluid and apparatus to traverse between the surface 12 and the hydrocarbon-bearing formation 14 or other subterranean formations. Besides defining the void volume of the wellbore 10, the wellbore wall 16 may also act as an interface through which fluid can transition between the hydrocarbon-bearing subterranean formations 14 through which the wellbore 10 traverses and the interior of the wellbore 10. The wellbore wall 16 can be unlined (that is, bare rock or formation) to permit such interaction with the formation or lined (that is, with one or more tubular strings 20 as previously described in this disclosure) so as to not permit such interactions.

The wellbore 10 may contain at least a portion of a fluid conduit 18 linking the interior of the wellbore 10 to the surface 12. The fluid conduit 18 connecting the interior of the wellbore 10 to the surface 12 may be capable of permitting regulated fluid flow from the interior of the wellbore 10 to the surface 12. The fluid conduit 18 may also permit access between equipment on the surface 12 and the interior of the wellbore 10. As previously described, the fluid conduit 18 may be defined by one or a plurality of tubular strings 20 installed in the wellbore 10, which may form a wellbore annulus 22 with the wellbore wall 16 of the wellbore 10. The wellbore annulus 22 is an annular volume defined between an external surface 24 of the tubular string 20 and the wellbore wall 16. As wellbore drilling continues and the wellbore 10 extends deeper into the hydrocarbon bearing subterranean formation 14, one or more additional tubular strings 20 may be installed within the fluid conduit 18 defined by the initial tubular string 20. Additional tubular strings 20 may have outer cross-sectional dimensions that are less than the inner cross-sectional dimensions of the tubular strings 20 within which the additional tubular strings are disposed. Each additional tubular string 20, when installed in the wellbore 10, may form a casing-casing annulus 32 defined between the exterior surface 24 of the additional tubular string 20 and the interior surface 26 of the tubular string 20 surrounding the additional tubular string. After drilling is complete and the wellbore 10 is fitted with production tubing for production, the wellbore 10 may include a plurality of tubular strings 20 of progressively smaller cross-sectional dimensions that define the wellbore annulus 22 and a plurality of casing-casing annuli 32 (annular region defined between two tubular strings).

As previously described in this disclosure, installing each tubular string 20 may include positioning the tubular string 20 in the wellbore 10 and primary cementing of the tubular string 20 in the wellbore 10. The primary cementing process may include placing a cement composition in the wellbore annulus 22, casing-casing annulus 32, or both, and curing the cement composition to seal the wellbore annulus 22, casing-casing annulus 32, or both. Primary cementing may anchor and support the tubular string 20 in the wellbore 10. Primary sealing may also provide a hydraulic seal in the annulus (wellbore annulus 22, casing-casing annulus 32, or both) that may prevent migration of gases and liquids from one side of the hydraulic seal to the other. This hydraulic seal may prevent fluid communication between production zones in the wellbore 10, referred to as zonal isolation, or may prevent migration of fluids to the surface 12.

Before primary sealing can be performed, the wellbore 10 may be drilled using a drill string (not shown) in the presence of a drilling fluid, which may be retained in the wellbore 10 at the conclusion of drilling, such as in the fluid conduit 18. With the drilling fluid left in the wellbore 10, the tubular string 20 may be positioned in the wellbore 10. When the tubular string 20 is positioned in the wellbore 10, the drilling fluid may occupy the interior volume of the tubular string 20 as well as the wellbore annulus 22 between the exterior surface 24 of the tubular string 20 and the wellbore wall 16. For interior tubular strings, the tubular string 20 may form a wellbore annulus 22 between the exterior surface 24 and the wellbore wall 16 along part of the length of the tubular string 20 and a casing-casing annulus 32 between the exterior surface 24 and an interior surface 26 of the previously installed tubular string 20. A displacement fluid may be pumped down the fluid conduit 18 after the cement to displace the cement composition from the fluid conduit 18 up into the wellbore annulus 22, casing-casing annulus 32, or both.

Cements commonly used for cementing tubular strings in wellbores or remediating lost circulation zones or water zones may often include a mixture of metal oxides, such as but not limited to calcium oxide (CaO), iron (II) oxide (FeO), iron (III) oxide ($Fe_2O_3$), sodium oxide ($Na_2O$), phosphorus (V) pentoxide ($P_2O_5$), alumina ($Al_2O_3$), magnesium oxide (MgO), potassium oxide ($K_2O$), silica ($SiO_2$), lithium oxide ($Li_2O$), titania ($TiO_2$), dicalcium silicate ($Ca_2SiO_4$), tricalcium silicate ($Ca_3SiO_5$), tricalcium aluminate ($3CaO \cdot Al_2O_3$, abbreviated C3A), tetracalcium alumina ferrite ($4CaO \cdot Al_2O_3Fe_2O_3$, abbreviated C4AF), other metal oxides, or combinations of these. In particular, cements for wellbore cementing applications may include four main components: tricalcium silicate ($Ca_3SiO_5$) responsible for the early strength development, dicalcium silicate ($Ca_2SiO_4$) responsible for the final strength, tricalcium aluminate ($3CaO \cdot Al_2O_3$) contributing to the early strength, and tetracalcium alumina ferrite (C4AF). These phases are sometimes called alite and belite respectively. In addition, gypsum may be included in the cement composition.

The silicates phase in the cement solid phase (before addition of water) is about 75 weight percent (wt. %) to 85 wt. % based on the total weight of the solid material in the cement. Tricalcium silicate (C3S) may be the major constituent of the silicates phase, with concentrations as high as 60 wt. % to 65 wt. % based on the total weight of the solid material in the cement. The quantity of dicalcium silicate normally does not exceed 20 wt. %. However, the concentration of dicalcium silicate may exceed 20 wt. % in the case of retarded cements. The hydration products for tricalcium silicate and dicalcium silicate are calcium silicate hydrate (C3S2H) and calcium hydroxide (Ca $(OH)_2$), which is also known as Portlandite. The calcium silicate hydrate, which may be commonly referred to as CSH gel, may have a variable ratio of calcium to silicate (Ca:$SiO_2$) and variable ratio of hydrogen to silicate (H:$SiO_2$) depending on the temperature, the calcium concentration in the aqueous phase, and the curing time. The calcium silicate hydrate (CSH gel) may comprise +/−70% of fully hydrated Portland cement at ambient conditions and is considered the principal binder of hardened cement. By contrast, the calcium hydroxide is highly crystalline and may be present in concentrations of from 15 wt. % to 20 wt. %, which can be the reason for the high pH of cement.

Upon contact with water, the gypsum in the cement partially dissolves, releasing calcium and sulphate ions to react with the aluminate and hydroxyl ions produced by the tricalcium aluminate (C3A) to form a calcium trisulphoaluminate hydrate, which may be known as the mineral Ettringite ($Ca_6Al_2(SO_4)_3(OH)_{12} \cdot 26H_2O$ (abbreviated C3A·3CS·32H)). The trisulpho-aluminate hydrate precipitates onto the surfaces of the tricalcium aluminate (C3A), which may prevent further rapid hydration (flash-set) of the tricalcium aluminate. The gypsum is gradually consumed and Ettringite continues to precipitate until the gypsum is consumed. The sulphate ion concentration decreases and the Ettringite will become unstable converting to calcium monosulphoaluminate hydrate. The remaining unhydrated tricalcium aluminate will form calcium aluminate hydrate.

Cement slurry design is based on the altering or inhibition of the hydration reactions with specific additives. Cement must be designed in a way to ensure acceptable properties such as mix ability, stability, rheology, fluid loss, and adequate thickening time. Different chemicals may be used when designing cement slurries. These chemicals may include but are not limited to set retarders, fluid loss additives, dispersants, gas migration additives, and expansion additives.

Cement retarders are cement additives whose function is to retard or delay the setting or thickening time of cement slurries. For a wellbore with a downhole temperature of 125° F. (50° C.) or less, cement retarders are generally not needed. However, as downhole temperature increases, the hydration process of tricalcium silicates increases and, hence, the thickening time decreases. The decrease in thickening time may cause problems in that the cement compositions may thicken to the point that they are no longer pumpable before the cement composition can be fully deployed, such as fully displaced into the annulus or fully injected into a lost circulation zone, water zone, or other zone of the subterranean formation. In addition to retarder additives which can be added to cements, retarded cements are available that have an increased setting time compared to normal cements without the use of cement retarders. These retarded cements can contain lignin, gums, starches, or other compounds that increase the setting time of the retarded cement. However, these retarded cements may not be compatible with cement additives and the setting times may be difficult to control consistently.

To explain the mechanism of retardation in Portland cements, the following four theories have been proposed: adsorption, precipitation, nucleation and complexation. According to the adsorption theory, the cement retarder is adsorbed onto the surfaces of the hydration products to inhibit contact with water. This theory suggests that retardation is due in part to the adsorption onto the surface of the calcium silicate hydrate (CSH gel) hydration product formed around the grains of tricalcium silicate, rendering the calcium silicate hydrate hydrophobic. The precipitation theory suggests that the cement retarder reacts with calcium and/or hydroxyl ions and forms an impermeable sheet covering cement grains.

In the nucleation theory, it is suggested that the cement retarder slows down the growth rate of hydration products by adsorbing onto their nuclei. Finally, the complexation theory states that calcium ions are chelated by the cement retarder, which chelation may reduce or prevent the formation of the nuclei. It is possible that all of the above effects are involved to some extent in the retardation process. The predominant factor depends on the type of cement retarder used and the cement phases upon which the cement retarder acts.

As previously discussed, the cement compositions of the present disclosure include at least a cement precursor, water, and a cement retarder comprising a hydrocarboxylic acid derivative. The cement composition may be more stable under higher downhole temperatures, such as downhole temperatures greater than or equal to 50° C., due to the cement retarder of the present disclosure having more unsaturated compounds compared to commercially available cement retarders.

The cement retarder may decrease the curing rate of the cement composition, which may increase the initial and final setting time of the cement slurry in wellbores for producing hydrocarbons. The cement retarders of the present disclosure may include one or more hydrocarboxylic acids, hydrocarboxylic acid derivatives, or both. In embodiments, the hydrocarboxylic acid derivatives in the cement retarder may comprise the dimers of hydrocarboxylic acids, the trimers of hydrocarboxylic acids, or both. In embodiments, the cement retarder may include one or more hydrocarboxylic acid dimers having the general chemical formula in the following chemical formula (I):

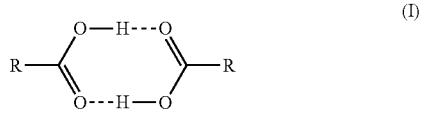

(I)

In chemical formula (I), R can be a saturated or unsaturated hydrocarbyl group having from 2-20 carbon atoms. The two R groups can be linear or branched. The two R groups can be the same or different. In embodiments, the cement retarder may include one or more trimers of hydrocarboxylic acids.

The hydrocarboxylic acids, hydrocarboxylic acid derivatives, or both of the cement retarders of the present disclosure contain hydroxyl groups and carboxyl groups in their molecular structures. The retarding action of the hydrocarboxylic acids and their salts is generally attributed to the presence of alpha or beta hydrocarboxylic groups (HO—C—$CO_2$H and HO—C—C—$CO_2$H, respectively) that are capable of strongly chelating metal cations such as calcium. However, not intending to be limited by any particular theory, it is believed that the retardation mechanism reaction for hydrocarboxylic acids and hydrocarboxylic acid derivatives is best characterized by the nucleation theory of cement retarding previously discussed in the present disclosure. Under the nucleation theory of cement retardation, it is suggested that the cement retarder slows down the growth rate of hydration products by adsorbing onto their nuclei. In the case of the hydrocarboxylic acid derivatives, the strong chelation of the alpha and beta hydrocarboxylic groups may cause the hydrocarboxylic acid derivatives to more easily adsorb onto the surfaces of the calcium containing hydration products, thereby inhibiting further growth hydration of the cement precursors, hydration products, or both.

In embodiments, the hydrocarboxylic acid derivatives of the cement retarder may be an alkali metal gluconate salt, such as sodium gluconate. In embodiments, the cement retarder may comprise sodium gluconate. Sodium gluconate is the sodium salt of gluconic acid and has chemical formula $NaC_6H_{11}O_7$. The following chemical formula (II) shows the general chemical structure for sodium gluconate:

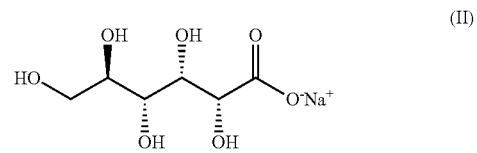

(II)

In embodiments, the cement retarder may include gluconate dimers, gluconate trimers, or combinations of these. In embodiments, the cement retarder may include dimers of the hydrocarboxylic acids, dimers of hydrocarboxylic acid derivatives, trimers of the hydrocarboxylic acids, trimers of hydrocarboxylic acid derivatives, or combinations thereof.

The cement retarder comprising the hydrocarboxylic acid derivatives may be substantially free of chlorides. In embodiments, the cement retarder may have less than or equal to 1 wt. %, less than or equal to 0.1 wt. %, or even less than or equal to 0.01 wt. % chlorides based on the total weight of the cement retarder. The cement retarders of the present disclosure comprising hydrocarboxylic acid derivatives may have an alkali content of less than 5.0 grams per liter. The alkali content of the cement retarder is significant to form a protective skin. As pH of the alkaline solution rises to over 12, insoluble derivatives of the cement retarder are formed by reaction within few minutes after first contact of water with cement. These insoluble derivatives surround the cement grains to form a protective layer. The cement retarders of the present disclosure may have a specific gravity of from 1.16 to 1.5 at a temperature of 20° C., where the specific gravity is relative to water at 20° C.

Figure 2:
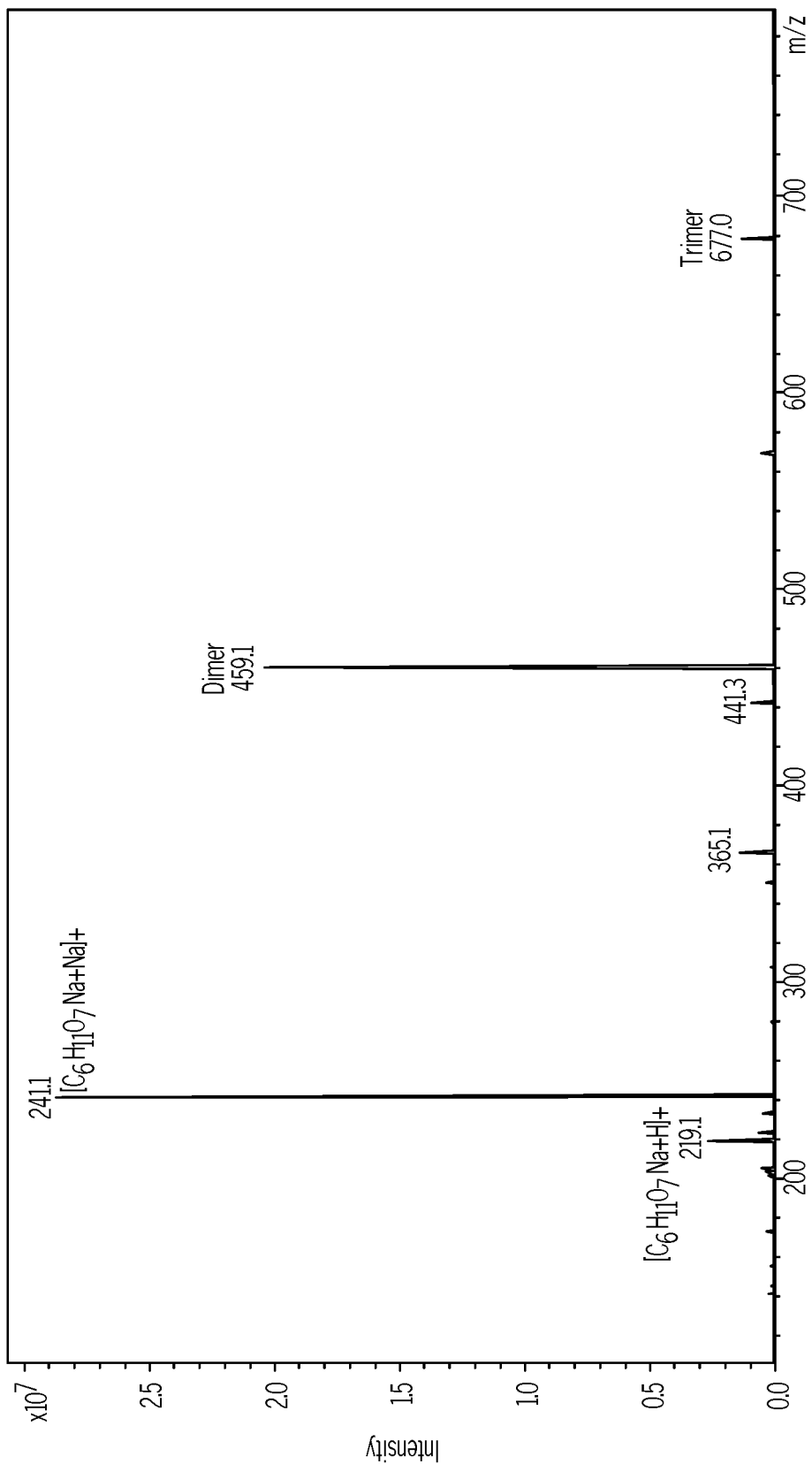
FIG. 2 graphically depicts Mass Spectrometry (MS) analysis of the cement retarder comprising the hydrocarboxylic acid derivatives (Example 2), according to one or more embodiments shown and described in the present disclosure.

Referring now to FIG. 2, the mass spectrometry (MS) analysis of an exemplary cement retarder of the present disclosure is graphically depicted. As shown by the MS analysis in FIG. 2, the cement retarder of the present disclosure can include sodium gluconate in the greatest amount, as indicated by the peak at 219.1 nanometers (nm) and 241.1 nm. The peak at 241.1 nm corresponds to sodium gluconate. The peaks at 459.1 and 677.0 indicate the presence of dimers and trimers, respectively, of sodium gluconate. For FIG. 2, the mass spectrometry analysis was conducted using a mass spectrometer according to known methods.

Figure 3:
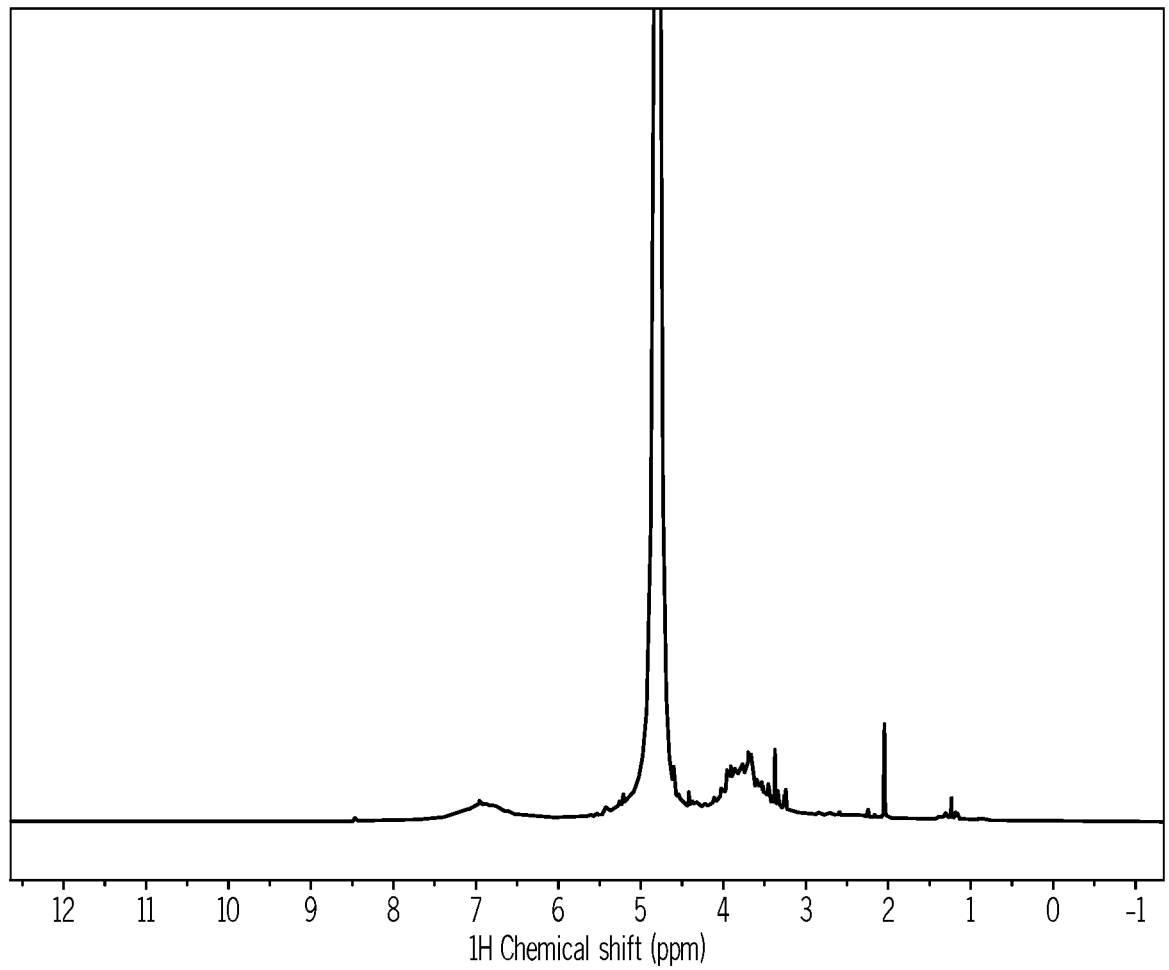
FIG. 3 graphically depicts a $_1$H Nuclear Magnetic Resonance (NMR) spectroscopy spectrum for a comparative commercially-available cement retarder (Comparative Example 1), according to the prior art.
Figure 4:
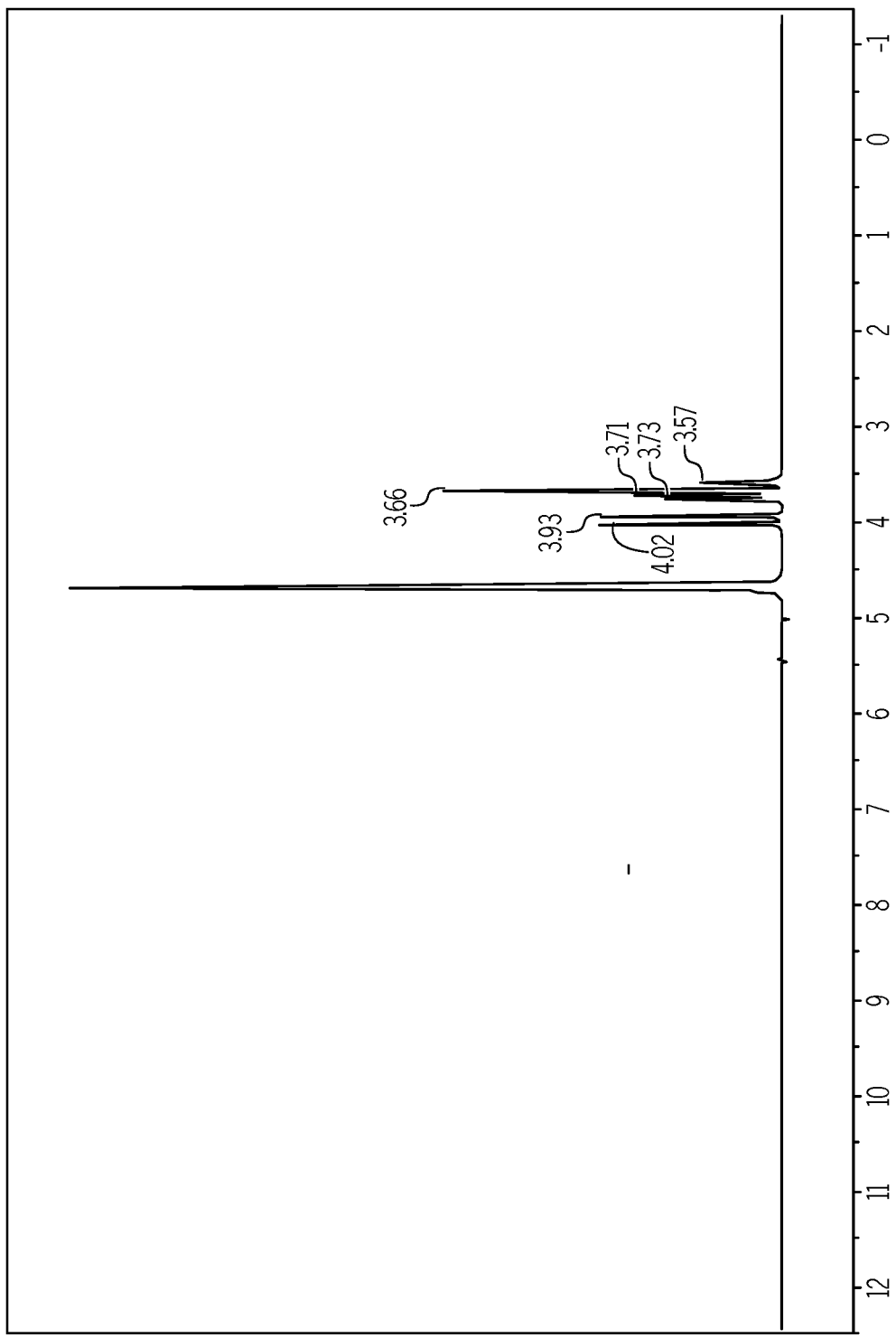
FIG. 4 graphically depicts a $_1$H NMR spectrum of a cement retarder comprising hydrocarboxylic acid derivatives (Example 2), according to one or more embodiments shown and described in the present disclosure.
Figure 5:
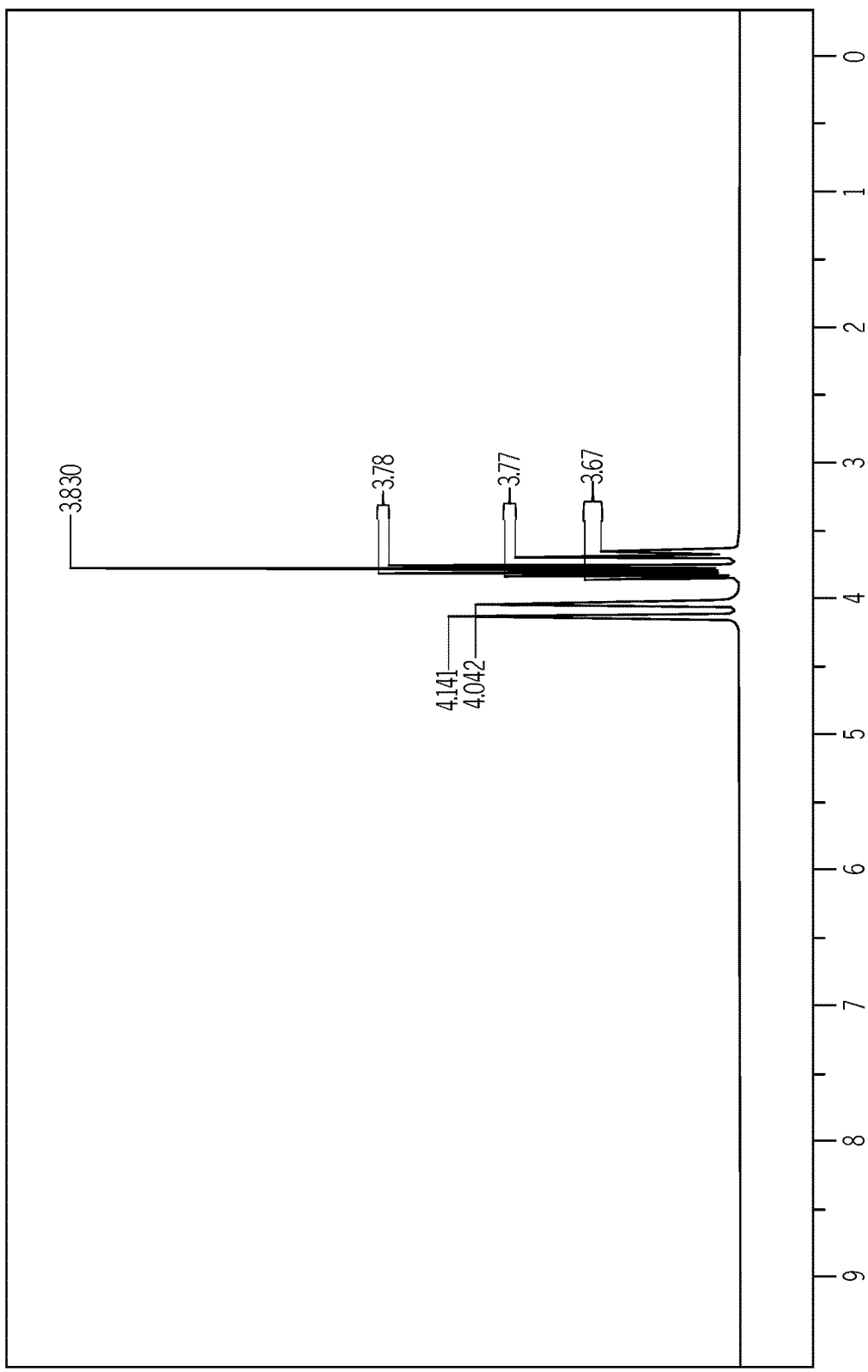
FIG. 5 graphically depicts a $_1$H NMR spectrum of sodium D-gluconate, according to one or more embodiments shown and described in the present disclosure.
Figure 6:
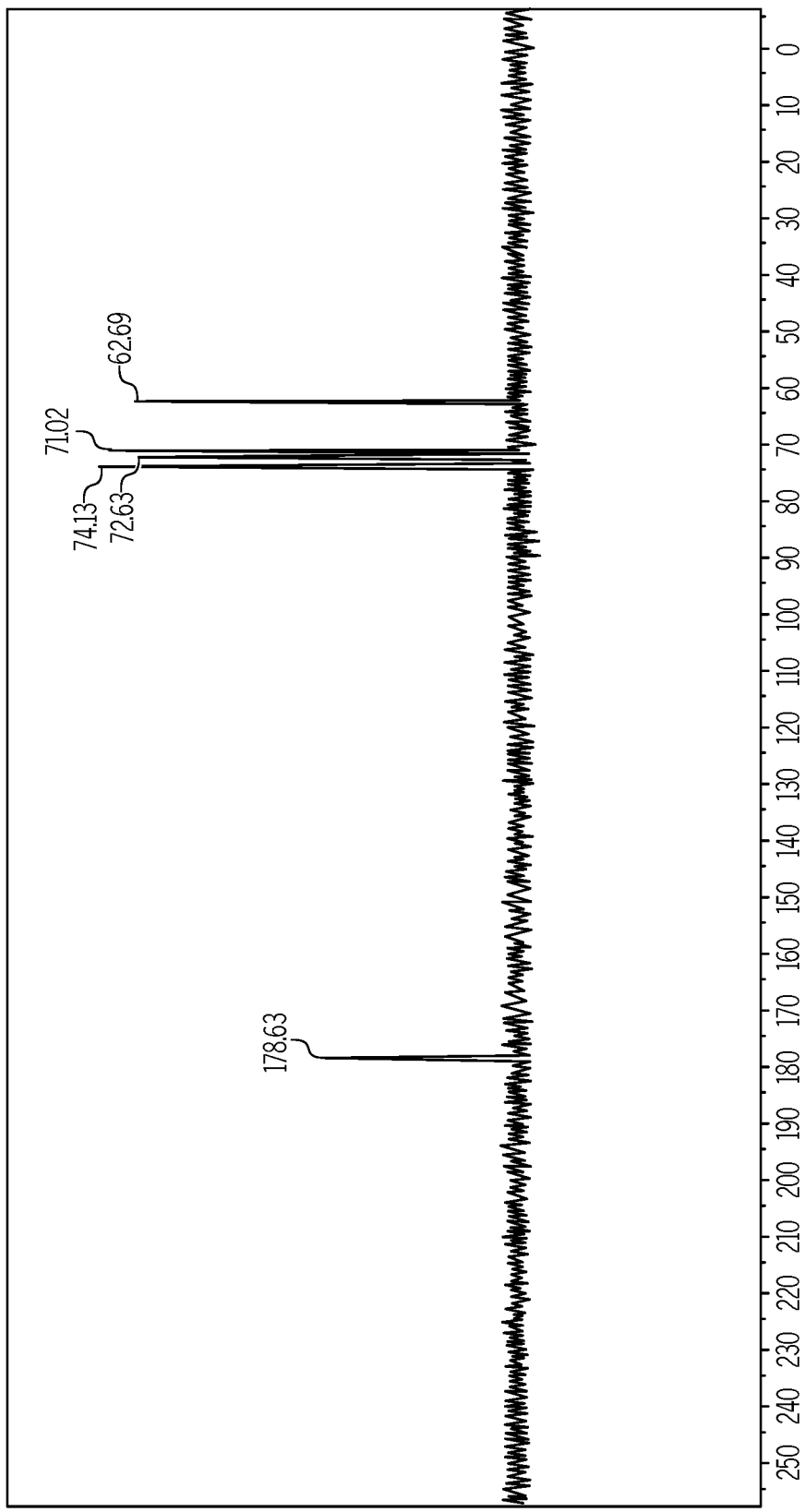
FIG. 6 graphically depicts a $_{13}$C-$_1$H NMR spectrum of the cement retarder comprising hydrocarboxylic acid derivatives (Example 2), according to one or more embodiments shown and described in the present disclosure.
Figure 7:
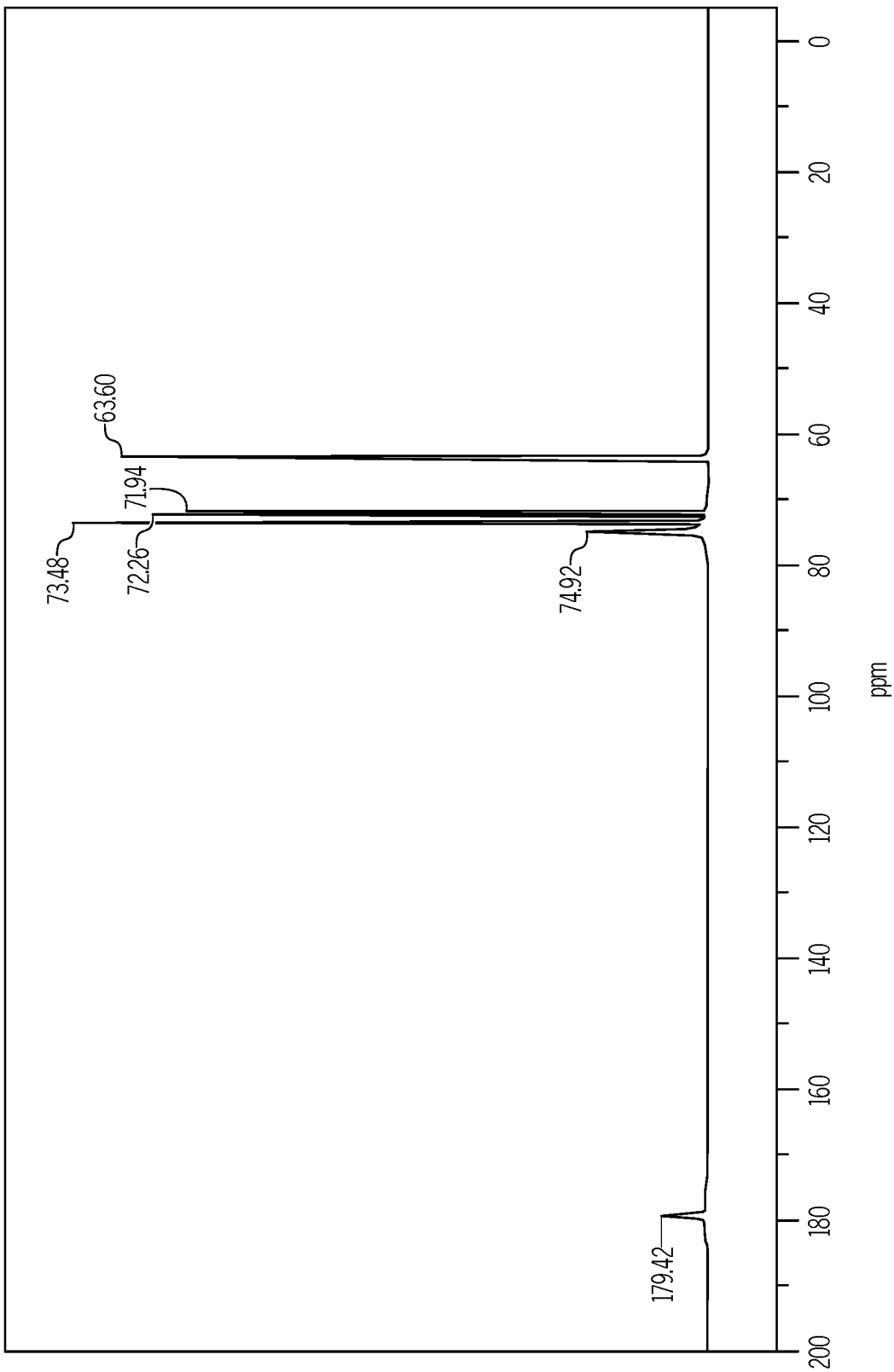
FIG. 7 graphically depicts a $_{13}$C-$_1$H NMR spectrum of sodium D-gluconate, according to one or more embodiments shown and described in the present disclosure.

Referring to FIG. 3, a $_1$H Nuclear Magnetic Resonance (NMR) spectroscopy spectrum for a comparative commercially-available cement retarder (Comparative Example 1) is graphically depicted. It is believed that the main component in the comparative commercially-available cement retarder is sodium polynaphthalene sulfonate polymer. Referring now to FIG. 4, an $_1$H NMR spectrum of the exemplary embodiment of the cement retarder of the present disclosure is graphically depicted. As shown by the $_1$H NMR spectrum in FIG. 4, the cement retarder of the present disclosure comprises a different chemical signature compared to the comparative commercially-available cement retarder in FIG. 3. Referring now to FIG. 5, the $_1$H NMR spectrum of sodium gluconate is graphically depicted. Comparison of the $_1$H NMR spectrum of FIG. 4 for the cement retarder of the present disclosure with the $_1$H NMR spectrum of sodium gluconate in FIG. 5 confirms the presence of sodium gluconate in the exemplary cement retarder. Referring now to FIG. 6, a $_{13}$C-$_1$H NMR spectrum of the exemplary cement retarder comprising hydrocarboxylic acid derivatives is graphically depicted. FIG. 7 graphically depicts the $_{13}$C-$_1$H NMR spectrum of sodium D-gluconate. Comparison of the $_{13}$C-$_1$H NMR spectrum of FIG. 6 with the $_{13}$C-$_1$H NMR spectrum of sodium gluconate in FIG. 7 confirms that the exemplary cement retarders of the present disclosure can include sodium gluconate. For FIGS. 3-7, the NMR spectroscopy spectra are determined according to well-known methods.

In embodiments, the active agents in the cement retarder comprise mainly hydrocarboxylic acid derivatives, such as greater than 50%, greater than 75%, greater than 90%, greater than 95%, or even greater than 98% by weight hydrocarboxylic acid derivatives based on the total weight of active agents in the cement retarder, where the active agents refer to any compounds other than the diluent. In embodiments, the cement retarder may consist or consist essentially of the hydrocarboxylic acid derivatives and optionally a diluent. In embodiments, the cement retarder may consist or consist essentially of an alkali metal or alkaline earth metal gluconate and optionally a diluent. In embodiments, the cement retarder may consist of or consist essentially of sodium D-gluconate ($C_6H_{11}O_7NA$) and optionally a diluent. In embodiments, the cement retarder, cement composition, or both do not contain boron or boron containing compounds, such as but not limited to borate compounds, borax, boric acid, derivatives thereof, or combinations of these. In embodiments, the cement retarder, cement composition, or both do not comprise phosphonates, phosphonic acid derivatives, or other phosphorous-containing compounds. In embodiments, the cement retarders do not include lignosulfonates, lignosulfonate salts, lignosulfonate derivatives.

The cement compositions may include an amount of the cement retarder sufficient to decrease the rate of curing of the cement composition so that the cement composition can be dispensed into the annulus before curing into a cured cement. The cement compositions may include less than or equal to 10% BWOC cement retarders, such as less than or equal to 5% BWOC, or even less than or equal to 3% BWOC cement retarders. The cement compositions may include from greater than 0.0% BWOC to 10% BWOC, from greater than 0.0% BWOC to 5% BWOC, from greater than 0.0% BWOC to 3% BWOC, from 0.1% BWOC to 10% BWOC, from 0.1% BWOC to 5% BWOC, from 0.1% BWOC to 3% BWOC, from 1% BWOC to 10% BWOC, from 1% BWOC to 5% BWOC, or from 1% BWOC to 3% BWOC cement retarders.

In addition to the cement retarder, the cement compositions of the present disclosure include at least a cement precursor and water. The cement compositions may further include one or more of silica sand, silica flour, weighting agents, defoamers, or combinations of these. The cement compositions may also include one or more additives, such as but not limited to, one or more of an expansion additive, a friction reducer, a gas block stabilizer, a dispersant, a surfactant, a latex, a latex stabilizers, epoxy resins, epoxy curing agents, or combinations of these. Other constituents known in the art of primary cementing may also be incorporated into the cement compositions.

The cement precursors may include any suitable materials which, when mixed with water, can be cured into a cement. The cement precursors may include hydraulic or non-hydraulic cement precursors. A hydraulic cement precursor may include a mixture of limestone, clay, and gypsum burned together at temperatures greater than 1,000 degrees Celsius (° C.). Cement compositions prepared with hydraulic cement precursors may harden instantly or within a few minutes when contacted with water. A non-hydraulic cement precursor may include mixtures of lime, gypsum, plasters, and oxychlorides. Cement compositions prepared with non-hydraulic cement precursors may take longer to harden or may require drying conditions for proper strengthening, but may be more economically feasible. The cement precursor may include one or more classes of cement precursors identified by the American Petroleum Institute (API), such as an API Class G cement. The cement precursor may comprise, consist of, or consist essentially of a Portland cement precursor, such as but not limited to a Class G Portland cement. Portland cement is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition. The cement precursor may also include a Saudi Class G cement precursor, which may include a mixture of Portland cement and crystalline silica, which may be referred in the alternative as quartz.

The cement precursor may include one or more of calcium hydroxide, silicates, oxides, belite ($Ca_2SiO_4$), alite ($Ca_3SiO_5$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, quartz, other cement precursor material, or any combination of these.

The cement compositions may include Saudi Class G cement as the cement precursor. In embodiments, the cement precursor may consist or consist essentially of Saudi Class G cement. Saudi Class G cement may include from 60 wt. % to 100 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 70 wt. % to 100 wt. %, from 70 wt. % to 99 wt. %, from 70 wt. % to 97 wt. %, from 70 wt. % to 95 wt. %, from 70 wt. % to 90 wt. %, from 70 wt. % to 80 wt. %, from 80 wt. % to 100 wt. %, from 80 wt. % to 99 wt. %, from 80 wt. % to 97 wt. %, from 80 wt. % to 95 wt. %, from 80 wt. % to 90 wt. %, from 90 wt. % to 100 wt. %, from 90 wt. % to 99 wt. %, from 90 wt. % to 97 wt. %, from 90 wt. % to 95 wt. %, from 95 wt. % to 100 wt. %, or from 95 wt. % to 99 wt. % Portland cement based on the total weight of the Saudi Class G cement precursor. Saudi Class G cement precursor may include less than 40 wt. %, less than 30 wt. %, less than 20 wt. %, less than 10 wt. %, less than 5 wt. %, less than 3 wt. %, or even less than 1 wt. % crystalline silica, or quartz based on the total weight of the Saudi Class G cement precursor. Saudi Class G cement precursor may have a pH greater than 7, such as from 8 to 14, from 10 to 13, from 11 to 13, from 12 to 13, or 12.4. Saudi Class G cement may have a bulk density at 20° C. of from 70 pounds per cubic foot ($lb/ft^3$) (1121 kilograms per cubic meter ($kg/m^3$), where 1 $lb/ft^3$ equals 16.0185 $kg/m^3$) to 120 $lb/ft^3$ (1922 $kg/m^3$), from 80 $lb/ft^3$ (1281 $kg/m^3$) to 110 $lb/ft^3$ (1762 $kg/m^3$), or from 90 $lb/ft^3$ (1442 $kg/m^3$) to 100 $lb/ft^3$ (1602 $kg/m^3$), or 94 $lb/ft^3$ (1506 $kg/m^3$). Saudi Class G cement precursor may have a solubility in water of from 0.1 grams per 100 milliliters (g/100 ml) to 2 g/100 ml, from 0.1 g/100 ml to 1 g/100 ml, from 0.1 g/100 ml to 0.8 g/100 ml, from 0.1 g/100 ml to 0.5 g/100 ml, from 0.2 g/100 ml to 2 g/100 ml, from 0.2 g/100 ml to 1 g/100 ml, from 0.2 g/100 ml to 0.8 g/100 ml, from 0.2 g/100 ml to 0.5 g/100 ml, from 0.5 g/100 ml to 2 g/100 ml, from 0.5 g/100 ml to 1 g/100 ml, from 0.5 g/ml to 0.8 g/100 ml, or 0.5 g/100 ml. An exemplary composition of a Class G cement is provided in Table 1 in the Examples. In embodiments, the cement precursor is not a geopolymer cement.

In embodiments, the cement precursor may include tricalcium silicate, dicalcium silicate, tricalcium aluminate, tetracalcium alumina ferrite, or combinations of these. In embodiments, the cement precursor may further include gypsum. The cement precursor may include from 75 wt. % to 85 wt. % silicates (tricalcium silicate, dicalcium silicate, and any other silicates) based on the total weight of the cement precursor. In embodiments, the cement precursor may include from 60 wt. % to 65 wt. % tricalcium silicate based on the total weight of the cement precursor. In embodiments, the cement precursor may include from 1 wt. % to 20 wt. % dicalcium silicate based on the total weight of the cement precursor.

The cement compositions may include an amount of cement precursor sufficient to produce a hard rigid cement upon curing. The cement compositions may include greater than or equal to 10 wt. %, greater than or equal to 20 wt. %, greater than or equal to 30 wt. %, or greater than or equal to 50 wt. % cement precursors based on the total weight of the cement composition. The cement compositions may include less than or equal to 80 wt. %, less than or equal to 70 wt. %, or even less than or equal to 60 wt. % cement precursors based on the total weight of the cement composition. The cement compositions may include from 10 wt. % to 80 wt. %, from 10 wt. % to 70 wt. %, from 10 wt. % to 60 wt. %, from 10 wt. % to 50 wt. %, from 20 wt. % to 80 wt. %, from 20 wt. % to 70 wt. %, from 20 wt. % to 60 wt. %, from 20 wt. % to 50 wt. %, from 30 wt. % to 80 wt. %, from 30 wt. % to 70 wt. %, from 30 wt. % to 60 wt. %, from 30 wt. % to 50 wt. %, from 50 wt. % to 80 wt. %, from 50 wt. % to 70 wt. %, or from 50 wt. % to 60 wt. % cement precursors based on the total weight of the cement composition. In embodiments, the cement compositions may include from 80 wt. % to 90 wt. % cement precursors based on the total weight of the cement composition.

Water may be added to the cement precursor and other constituents to produce the cement compositions. The water in the cement compositions may include distilled water, deionized water, filtered water, or tap water. The water used to produce the cement compositions may be in the form of an aqueous solution containing additives or contaminants. The water may include freshwater or seawater, natural or synthetic brine, salt water, municipal water, well water, formation water, produced water, brackish water, or combinations of these. Salts or other organic compounds may be incorporated into the water to control certain properties of the water, and thus control properties of the cement composition, such as density. Suitable salts may include, but are not limited to, alkali metal chlorides, hydroxides, or carboxylates. In embodiments, salts present in the water may include, but are not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. In embodiments, the water may have less than 1 wt. % salts based on the total weight of the water. The water may have less than 0.1 wt. % salts or even less than 0.01 wt. % salts based on the total weight of the water.

The cement compositions may include an amount of water sufficient to allow the cement composition slurry to be pumped into the annulus or into a lost circulation zone or water zone of a wellbore. The amount of water may be sufficient to cause curing of the cement composition. The cement compositions may have greater than or equal 5 wt. %, greater than or equal to 10 wt. %, or greater than or equal 15 wt. % water based on the total weight of the cement composition. The cement compositions may include less than or equal to 70 wt. %, less than or equal to 60 wt. %, less than or equal to 50 wt. %, or even less than or equal to 40 wt. % water based on the total weight of the cement composition. The cement compositions may include from 5 wt. % to 70 wt. %, from 5 wt. % to 60 wt. %, from 5 wt. % to 50 wt. %, from 5 wt. % to 40 wt. %, from 5 wt. % to 20 wt. %, from 10 wt. % to 70 wt. %, from 10 wt. % to 60 wt. %, from 10 wt. % to 50 wt. %, from 10 wt. % to 40 wt. %, from 15 wt. % to 70 wt. %, from 15 wt. % to 60 wt. %, from 15 wt. % to 50 wt. %, or from 15 wt. % to 40 wt. % water based on the total weight of the cement composition.

As previously discussed, the cement compositions may include silica sand, silica flour, weighting agents, defoamers, or combinations of these. Silica sand, silica flour, or both may be included in the cement compositions as strength stabilizing agents. Silica sand, silica flour, or both, may be used to stabilize the strength and permeability of the cement compositions at downhole temperatures between 230° F. and 700° F. (110° C. and 371° C.), prevent strength retrogression, and decrease the permeability of the cured cement. Silica sand may include any naturally-occurring or man-made silica sand. The silica sand may have an average particle size of from 100 micrometers (μm) (microns) to 200 μm, from 100 μm to 180 μm, from 100 μm to 175 μm, from 150 μm to 200 μm, from 150 μm to 180 μm, from 150 μm to 175 μm, from 175 μm to 200 μm, or from 180 μm to 200 μm. The cement compositions may include from 0% BWOC to 50% BWOC silica sand, from 0% BWOC to 20% BWOC, from 0% BWOC to 10%, BWOC, from 1% BWOC to 50% BWOC, from 1% BWOC to 20% BWOC, from 1% BWOC to 10% BWOC, from 10% BWOC to 50% BWOC, or from 10% to 20% BWOC silica sand. In embodiments, the cement compositions may be substantially free of silica sand, such as having less than 1% BWOC, less than 0.1% BWOC, or even less than 0.01% BWOC silica sand. In embodiments, the cement compositions do not include silica sand.

The silica flour may be any naturally-occurring or man-made silica flour. The silica flour may have an average particle size less than the silica sand. The silica flour may have an average particle size less than 100 μm, less than or equal to 75 μm, less than or equal to 50 μm, less than or equal to 25 μm, less than or equal to 15 μm, or even less than or equal to 10 μm. The silica flour may have an average particle size of from 1 μm to less than 100 μm, from 1 μm to 75 μm, from 1 μm to 50 μm, from 1 μm to 25 μm, from 1 μm to 15 μm, from 5 μm to less than 100 μm, from 5 μm to 75 μm, from 5 μm to 50 μm, from 5 μm to 25 μm, or from 5 μm to 15 μm. The silica flour may be used in combination with silica sand to formulate the cement composition with a density of from 130 lb/ft$^3$ (2082 kg/m$^3$) to 165 lb/ft$^3$ (2643 kg/m$^3$), which may provide for resistance of gas migration problems through the cured cement. The combination of the silica sand and silica flour may increase the solids packing density of the cement compositions and thus reduce the permeability of the cured cement to gas flow, among other features.

The cement compositions may include from greater than 0% BWOC to 50% BWOC, from greater than 0% BWOC to 40% BWOC, from greater than 0% BWOC to 30% BWOC, from greater than 0% BWOC to 20% BWOC, from 1% BWOC to 50% BWOC, from 1% BWOC to 40% BWOC, from 1% BWOC to 30% BWOC, from 1% BWOC to 20%

BWOC, from 5% BWOC to 50% BWOC, from 5% BWOC to 40% BWOC, from 5% BWOC to 30% BWOC, from 5% BWOC to 20% BWOC silica flour. In embodiments, the cement compositions may be substantially free of silica flour, such as having less than 10% BWOC silica flour, less than 0.10% BWOC, or even less than 0.01% BWOC silica flour. In embodiments, the cement compositions do not include silica flour.

As previously discussed, the cement compositions may include a weighting agent, which may also be referred to as a "weighting material" or "weight material." The weighting agent may include particulate solids having a specific gravity (SG) sufficient to increase the density of the cement slurry. Examples of weighting agents may include, but are not limited to, sand, barite (barium sulfate), hematite, calcium carbonate, siderite, ilmenite, manganese oxide (MnO), hausmanite (manganese tetroxide ($Mn_3O_4$)), zinc oxide, zirconium oxide, iron oxide, fly ash, or any combination of these weighting agents. The cement compositions may include one weighting agent or a combination of two or more different weighting agents, each with different properties. The weighting agent may have a specific gravity (SG) of from 2 to 6, from 2 to 5, from 3 to 6, or from 3 to 5. The weighting agents may have a mean particle size distribution of from 0.1 µm to 50 µm, from 0.1 µm to 40 µm, from 0.1 µm to 30 µm, from 0.1 µm to 20 µm, from 0.1 µm to 10 µm, from 10 µm to 50 µm, from 10 µm to 40 µm, from 10 µm to 30 µm, from 10 µm to 20 µm, from 20 µm to 50 µm, from 20 µm to 40 µm, from 20 µm to 30 µm, from 30 µm to 50 µm, from 30 µm to 40 µm, or from 40 µm to 50 µm.

The cement compositions may include from 10% BWOC to 150% BWOC, from 10% BWOC to 125% BWOC, from 10% BWOC to 100%, from 10% BWOC to 75% BWOC, from 10% BWOC to 50% BWOC, from 20% BWOC to 150% BWOC, from 20% BWOC to 125% BWOC, from 20% BWOC to 100% BWOC, from 20% BWOC to 75% BWOC, from 20% BWOC to 50% BWOC, from 50% BWOC to 150% BWOC, from 50% BWOC to 125% BWOC, from 50% BWOC to 100% BWOC, from 50% BWOC to 75% BWOC, from 75% BWOC to 150% BWOC, or from 100% BWOC to 150% BWOC weighting agent. In embodiments, the cement compositions may be substantially free of weighting agents, such as having less than 1% BWOC, less than 0.1% BWOC, or even less than 0.01% BWOC weighting agents. In embodiments, the cement compositions do not include weighting agents.

The addition or one or more of these components to the cement compositions may reduce settling in the cement compositions. In embodiments, the inclusion of one or more of the silica sand, silica flour, weighting agent, or combinations of these may reduce the porosity of the cement compositions by including different particles size distributions of particles and components.

The cement compositions may include from 0.1% BWOC to 10% BWOC surfactant. In embodiments, the surfactants may include nonylphenol ethoxylate sulphate, alkyl polyglucoside, alkyl benzenesulfonic acid, oxyalkylated alkylphenol, or combinations thereof.

The cement compositions may include one or a plurality of defoamers. The defoamers, or "anti-foam additives," may be added to the cement compositions to prevent frothing, foaming, and vapor entrapment that may occur during the mixing process of a cement slurry. In embodiments, the defoamers may include (±)-1-phenyl-2,3,4,5-tetrahydro-(1h)-3-benzazepine-7,8-diol hydrochloride ($C_{16}H_{17}NO_2 \cdot HCl$), polyethylene glycol nonylphenyl ether sulfate sodium salt ($C_{30}H_{46}NaO_5S$), other defoamers, or combinations of these.

The cement compositions may include less than 5 gps defoamer, where gps refers to U.S. gallons per sack of cement precursor. The cement compositions may include less than or equal to 1 gps defoamer, or even less than or equal to 0.5 gps defoamer. In embodiments, the cement compositions may be substantially free of defoamers, such as having less than 0.1% BWOC, or even less than 0.01% BWOC defoamer. In embodiments, the cement compositions do not include defoamers.

In embodiments, the cement compositions may further include one or a plurality of latex additives and a latex stabilizer. As used in this disclosure, "latex" may refer to rubber materials commercially available in aqueous latex form, such as aqueous dispersions or emulsions. Latex additives may be added to the cement compositions to enhance the mechanical properties of the cured cement, such as but not limited to decreasing the elastic modulus, improving the tensile strength, and improving the compressive strength of the cured cement. Decreasing the elastic modulus of the cured cement may reduce brittleness, which may improve performance of the cement compositions in cementing zones that produce gas with gas flow potentials and formation gas pressures in ranges that can cause concern for production.

The latex additives may include an aqueous fluid and a solid elastomer. The latex additive can be any type of preformed latex containing the solid elastomer dispersed in the aqueous fluid to form an emulsion. The amount of aqueous fluid in the latex additive can be about 50 wt. % based on the total weight of the latex additive. The aqueous latex additive can be formed by polymerization of monomers in an emulsion polymerization process, where the polymerization of monomers forms the dispersed solid elastomer. The aqueous fluid may be water from any of the sources of water previously discussed in the present disclosure.

The solid elastomer can be any film forming elastomer containing butadiene monomers, styrene monomers, acrylonitrile monomers, ethylene monomers, vinyl acetate monomers, and combinations of these monomers. In embodiments, the solid elastomer may include butadiene monomer, styrene monomer, acrylonitrile monomer, and combinations of the same. In embodiments, the solid elastomer may include a combination of ethylene monomer and vinyl acetate monomer. The ratio of the different monomers can vary depending on the solid elastomer. The solid elastomer can also include a polar monomer in an amount from 1 wt. % to 10 wt. % based on the total weight of the solid elastomer. Examples of polar monomers can include but are not limited to acrylic acid salt and 2-acrylamide-2-methyl propane sulfonic acid salt. The polar monomer can be present to reinforce the stability of the emulsion of the aqueous latex. Examples of solid elastomers employed in latex additives may include, but are not limited to, natural rubbers such as (cis-1,4-polyisoprene), modified types of these natural rubbers, synthetic polymers, or combinations of these. The synthetic polymers may include styrene/butadiene rubber, cis-1,4-polybutadiene, high styrene resin, butyl rubber, ethylene/propylene rubber, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber, or polysulfide rubber. The aqueous latex additives can be commercially available aqueous latex additives. The aqueous latex additives can also include one or more liquid elastomers dispersed in the aqueous latex additive.

The cement compositions may include from 0.0% BWOC to 50% BWOC, from 0.0% BWOC to 30% BWOC, from 0.0% BWOC to 20% BWOC, from 0.1% BWOC to 50% BWOC, from 0.1% BWOC to 30% BWOC, from 0.1% BWOC to 20% BWOC, from 1% BWOC to 50% BWOC, from 1% BWOC to 30% BWOC, from 1% BWOC to 20% BWOC, from 5% BWOC to 50% BWOC, from 5% BWOC to 30% BWOC, or from 5% BWOC to 20% BWOC latex additive. In embodiments, the cement compositions may be substantially free of latex additive, such as having less than 1% BWOC or even less than 0.1% BWOC latex additive. In embodiments, the cement compositions do not include a latex additive.

When the latex additive is present, the cement compositions may include a latex stabilizer, which may be operable to reduce or prevent de-emulsification of the latex additive when contacted with water in the cement composition. The latex stabilizer may include one or more surfactants operable to maintain the emulsion of the latex additive. The surfactant of the latex stabilizer can be any type of surfactant capable of stabilizing the latex additive. Examples of the surfactant can include anionic surfactants, non-ionic surfactants, or combinations of these surfactants. Examples of anionic surfactants can include, but are not limited to, sodium dodecylbenzene sulfonate, sodium lauryl sulfonate, a sulfate salt of a nonylphenol ethoxylate containing 20-40 moles of ethylene oxide, or combinations of these surfactants. Examples of the non-ionic surfactants can include, but are not limited to, a nonylphenol ethoxylate containing 20-40 moles of ethylene oxide. The cement compositions may include from 0.0% BWOC to 10% BWOC latex stabilizer, such as from 0.1% BWOC to 10% BWOC, from 0.1% BWOC to 5% BWOC, from 1% BWOC to 10% BWOC, or from 1% BWOC to 5% BWOC latex stabilizer. In embodiments, the cement compositions may be substantially free of latex stabilizers, such as having less than or equal to 1% BWOC, less than 0.1% s BWOC, or even less than 0.01% BWOC latex stabilizer. In embodiments, the cement compositions do not include latex stabilizers.

The cement compositions may include additives, such as but not limited to, expansion additives, dispersants, fluid loss additives, friction reducers, gas block stabilizers, other additives, or combinations of these. In embodiments, the cement compositions may include an expansion additive. The expansion additive can be selected from known expansion additive compounds. Examples of expansion additives may include metal oxides, examples of which include, but are not limited to, calcium oxide (CaO), magnesium oxide (MgO), metal oxides of zinc, magnesium, iron, aluminum powders, or combinations of these. In embodiments, the expansion additive may be a calcined magnesium oxide. In embodiments, the expansion additive may be a mixture of calcium oxide and magnesium oxide. During curing, hydration of magnesium oxide to magnesium hydroxide may provide an expansive force within the cement matrix. Diameters of tubular strings, such casings and liners, may be affected by changes in temperature and pressure, and therefore, the diameters of such tubular strings may be reduced or expanded, which can lead to the formation of a microannulus between the tubular string and the cement or between the cement and the wellbore wall. The expansion additive may be used in the cement compositions to maintain a seal around the tubular string and against the wellbore wall of the wellbore to achieve superior bonding.

The cement compositions may include less than or equal to 10% BWOC expansion additive or less than or equal to 5% BWOC expansion additive. The cement compositions may include from 0.0% BWOC to 10% BWOC, from 0.0% BWOC to 5% BWOC, from 0.1% BWOC to 10% BWOC, from 0.1% BWOC to 5% BWOC, or from 1% BWOC to 10% BWOC expansion additive. In embodiments, the cement compositions may be substantially free of expansion additives, such as less than 1% BWOC, less than 0.1% BWOC, or even less than 0.01% BWOC expansion additive. In embodiments, the cement compositions do not include expansion additives.

The cement compositions may include a dispersant containing one or more anionic groups. In embodiments, the dispersant may comprise naphthalenesulfonic acid, a sodium salt, polymer with formaldehyde, or combinations thereof.

The cement compositions may include from 0.0% BWOC to 10% BWOC dispersant. In embodiments, the cement compositions may be substantially free of dispersants, such as having less than 1% BWOC, less than 0.1% BWOC, or even less than 0.01% BWOC dispersants. In embodiments, the cement compositions do not include dispersants. In embodiments, the dispersants do not include lignosulfonates, lignosulfonate salts, or lignosulfonate derivatives.

The cement compositions may include a fluid loss additive. The fluid loss additive may include non-ionic cellulose derivatives, such as, but not limited to, hydroxyethylcellulose (HEC). Alternatively or additionally, the fluid loss additive may be a non-ionic synthetic polymer, such as but not limited to, polyvinyl alcohol or polyethyleneimine. The fluid loss additive may also include one or more anionic synthetic polymers, such as, but not limited to, 2-acrylamido-2-methylpropane sulfonic acid (AMPS) or AMPS-copolymers, including lattices of AMPS-copolymers. The fluid loss additive may include bentonite. The fluid loss additive may include an acrylamide copolymer, an aliphatic amide polymer, an acrylic polymer, bentonite, latex polymers, gilsonite, additives to latex (for example, styrene-butadiene latex in combination with nonionic and anionic surfactants), octylphenol ethoxylate, polyethylene oxide, copolymers of maleic anhydride, 2-hydroxypropyl acrylate, or combinations of these. The cement compositions may include less than or equal to 5% BWOC, less than or equal to 1% BWOC, or even less than or equal to 0.5% BWOC fluid loss additive. The cement compositions may include from 0.001% BWOC to 5% BWOC, from 0.001% BWOC to 1% BWOC, from 0.001% BWOC to 0.5% BWOC, or from 0.001% BWOC to 0.01% BWOC fluid loss additive. In embodiments, the cement compositions do not include fluid loss additives.

The cement compositions may include a friction reducer. The friction reducer may be a sulfonic acid salt or an aromatic polymer derivative. Other cement friction reducers may include, but are not limited to, polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous sulfate, tannic acid, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. The cement compositions may include less than or equal to 10% BWOC friction reducer, such as less than or equal to 5% BWOC, less than or equal to 1% BWOC, or even less than or equal to 0.5% BWOC friction reducer. The cement compositions may include from 0.0% BWOC to 10% BWOC, from 0.0% BWOC to 5% BWOC, from 0.0% BWOC to 1% BWOC, from 0.0% BWOC to 0.5% BWOC, from 0.001% BWOC to 10% BWOC, from 0.001% BWOC to 5% BWOC, from 0.001% BWOC to 1% BWOC, or from 0.001% BWOC to 0.5% BWOC friction reducer. In embodiments, the cement compositions do not include friction reducers.

The cement compositions may include a gas block stabilizer. Gas block stabilizers may include, but are not limited to, an aminated aromatic salt, an alkyl ether sulfate, an aminated aromatic polymer, or combinations of these. The cement compositions may comprise less than 10 gallons per sack of cement (gps), less than or equal to 5 gps, or even less than or equal to 1 gps gas block stabilizer. The cement compositions may include from 0.0 gps to 10 gps, from 0.0 gps to 5 gps, from 0.0 gps to 1 gps, from 0.1 gps to 10 gps, from 0.1 gps to 5 gps, from 0.1 gps to 1 gps, from 1 gps to 10 gps, or from 1 gps to 5 gps of gas block stabilizer. In embodiments, the cement compositions do not include gas block stabilizers.

In embodiments, the cement compositions do not include carrageenan, copolymer of acrylamide-methyl-propane sulfonate and acrylamide, phosphonic acids, alkali metal citrates, or combinations thereof. In embodiments, the cement compositions may consist or consist essentially of the cement precursor, water, cement retarder, and optionally at least one of silica flour, silica sand, weighting agent, expansion additive, defoamer, friction reducer, gas block stabilizer, dispersant, latex, latex stabilizer, epoxy resin, epoxy curing agents, or combinations of these.

The cement compositions of the present disclosure may be prepared by combining the cement precursors, water, and cement retarder comprising the hydrocarboxylic acid derivatives and mixing the cement composition. Preparing the cement composition may also include combining one or more of silica sand, silica flour, weighting agents, defoamers, cement retarders, surfactants, latex, latex stabilizers, or combinations of these, with the cement precursor and water before or during mixing. Preparing the cement composition may further include adding one or a plurality of optional additives, such as but not limited to expansion additives, friction reducers, fluid loss additives, gas block stabilizers, other additives, or combinations of these, to the cement composition before or after mixing. The cement composition may be mixed for a period of time sufficient to produce a homogeneous mixture. In embodiments, the cement composition may be mixed for a period of from 10 minutes to 50 minutes, from 10 minutes to 40 minutes, from 10 minutes to 30 minutes, from 10 minutes to 20 minutes, from 15 minutes to 50 minutes, from 15 minutes to 40 minutes, from 15 minutes to 30 minutes, from 15 minutes to 20 minutes, from 20 minutes to 50 minutes, from 20 minutes to 40 minutes, from 20 minutes to 30 minutes, or about 30 minutes.

In embodiments, the cement composition of the present disclosure may include from 10 wt. % to 70 wt. % cement precursor based on the total weight of the cement composition, from 5 wt. % to 70 wt. % water based on the total weight of the cement composition, and from 0.1 percent BWOC to 10 percent BWOC cement retarder, where the cement retarder comprises at least one hydrocarboxylic acid derivative. The cement precursor may be an API class G cement. The cement precursor may include from 75 wt. % to 85 wt. % silicates based on the total weight of the cement precursor. In embodiments, the cement precursor may include from 60 wt. % to 65 wt. % tricalcium silicate based on the total weight of the cement precursor. In embodiments, the cement precursor may include from 1 wt. % to 20 wt. % dicalcium silicate based on the total weight of the cement precursor.

The cement composition may include from greater than 0 percent BWOC to 50 percent BWOC silica sand, from 5% BWOC to 50% BWOC silica flour. The cement composition may include from 10% BWOC to 150% BWOC weighting agent. The cement composition may further include from greater than 0% BWOC to less than or equal to 10% BWOC expansion additive, from greater than 0% BWOC to less than or equal to 5% BWOC defoamer, from greater than 0% BWOC to less than or equal to 10% BWOC latex, and from greater than 0% BWOC to less than or equal to 10% BWOC latex stabilizer. Any of the other additives previously discussed in the present disclosure may also be incorporated into the cement compositions.

The cement compositions of the present disclosure can be prepared with different density, viscosity, and mechanical properties by changing the concentrations of one or more constituents of the cement composition. Thus, the cement compositions may be adapted for use in different downhole conditions of the wellbore. The cement compositions of the present application may be adjusted to modify the rheology, density, and compressive strength of the cement composition, which may reduce or prevent the well integrity from being compromised during the well's lifetime.

The cement compositions may have a density of from 65 pounds per cubic foot (pcf) to 180 pcf (1041 kilograms per cubic meter ($kg/m^3$) to 2883 $kg/m^3$; where 1 pcf is equal to 16.02 $kg/m^3$). In embodiments, the cement compositions may have a density of from 65 pcf to 160 pcf, from 65 pcf to 140 pcf, from 65 pcf to 125 pcf, from 120 pcf to 180 pcf, from 120 pcf to 160 pcf, from 120 pcf to 140 pcf, from 125 pcf to 180 pcf, from 125 pcf to 160 pcf, from 125 pcf to 140 pcf, from 140 pcf to 180 pcf, from 140 pcf to 160 pcf, or from 160 pcf to 180 pcf.

The cement compositions may have a Bearden consistency (BC) of from 50 to 100 BC when measured using a high temperature high pressure (HTHP) consistometer according to the test methods provided subsequently in this disclosure. In measuring the Bearden consistency, the temperature of the cement composition may be increased to a temperature of 150° F. (65° C.) to simulate a bottom hole circulating temperature (BHCT) of 150° F. (65° C.), and the pressure of cement composition may be ramped up to a final pressure of 5200 pounds per square inch (psi) (36 MPa). The cement compositions may have a BC of from 50 BC to 90 BC, from 50 BC to 80 BC, from 50 BC to 70 BC, from 60 BC to 100 BC, from 60 BC to 90 BC, from 60 BC to 80 BC, from 60 BC to 70 BC, from 70 BC to 100 BC, from 70 BC to 90 BC, from 70 BC to 80 BC, from 80 BC to 100 BC, from 80 BC to 90 BC, or from 90 BC to 100 BC when measured using the HTHP consistometer according to the test methods provided subsequently in this disclosure.

Before introducing the cement composition to the wellbore or annulus and before any substantial curing of the cement has taken place (such as within less than 20 minutes after preparing the cement composition), the cement composition may have a plastic viscosity (PV) of from 1 centipoise (cP) to 200 cP when measured at a temperature from 70° F. to 300° F. (21° C. to 149° C.) according to the test methods provided subsequently in this disclosure. The cement composition may have a PV of from 1 cP to 150 cP, from 1 cP to 100 cP, from 1 cP to 50 cP, from 10 cP to 200 cP, from 10 cP to 150 cP, from 10 cP to 100 cP, from 10 cP to 50 cP, from 20 cP to 200 cP, from 20 cP to 150 cP, from 20 cP to 100 cP, or from 20 cP to 50 cP when measured at temperatures from 70° F. to 300° F. (21° C. to 149° C.), according to the test methods provided subsequently in this disclosure.

Before introducing the cement composition to the wellbore or annulus and before any substantial curing has taken place (such as within less than 20 minutes after preparing the cement composition), the cement composition may have a yield point (YP) of from 50 to 200 when measured at about 70° F. to about 300° F. (about 21° C. to about 149° C.) according to the test methods provided subsequently in this disclosure. In embodiments, the cement composition may have a YP of from 50 to 150, from 50 to 100, from 50 to 75, from 60 to 200, from 60 to 150, from 60 to 100, from 60 to 75, from 75 to 200, from 75 to 150, or from 75 to 100 when measured at about 70° F. to about 300° F. (about 21° C. to about 149° C.) according to the test methods provided subsequently in this disclosure. In embodiments, the cement compositions may have a YP of from 50 to 100 when measured at 181° F. (about 83° C.) according to the test methods provided subsequently in this disclosure.

The cement composition may have a gel strength before curing that enables the cement composition to suspend the weighting materials and other solids added to increase the density of the cement composition while maintaining the pump-ability of the cement composition to prevent stuck-pipe problems. The cement compositions may have a 10-second gel strength of from 1.0 pound of force per square foot (lbf/100 ft$^2$) to 30 lbf/100 ft$^2$, from 1 lbf/100 ft$^2$ to 25 lbf/100 ft$^2$, from 1 lbf/100 ft$^2$ to 20 lbf/100 ft$^2$, from 5 lbf/100 ft$^2$ to 30 lbf/100 ft$^2$, from 5 lbf/100 ft$^2$ to 25 lbf/100 ft$^2$, from 5 lbf/100 ft$^2$ to 20 lbf/100 ft$^2$, from 10 lbf/100 ft$^2$ to 30 lbf/100 ft$^2$, from 10 lbf/100 ft$^2$ to 25 lbf/100 ft$^2$, or from 10 lbf/100 ft$^2$ to 20 lbf/100 ft$^2$ measured immediately after preparation of the cement composition and before substantial curing has taken place, such as within 20 minutes of preparing the cement composition. The cement compositions may have a 10-minute gel strength of from 1 lbf/100 ft$^2$ to 60 lbf/100 ft$^2$, from 1 lbf/100 ft$^2$ to 55 lbf/100 ft$^2$, from 1 lbf/100 ft$^2$ to 50 lbf/100 ft$^2$, from 10 lbf/100 ft$^2$ to 60 lbf/100 ft$^2$, from 10 lbf/100 ft$^2$ to 55 lbf/100 ft$^2$, from 10 lbf/100 ft$^2$ to 50 lbf/100 ft$^2$, from 20 lbf/100 ft$^2$ to 60 lbf/100 ft$^2$, from 20 lbf/100 ft$^2$ to 55 lbf/100 ft$^2$, from 20 lbf/100 ft$^2$ to 50 lbf/100 ft$^2$, from 30 lbf/100 ft$^2$ to 60 lbf/100 ft$^2$, from 30 lbf/100 ft$^2$ to 55 lbf/100 ft$^2$, from 30 lbf/100 ft$^2$ to 50 lbf/100 ft$^2$, from 40 lbf/100 ft$^2$ to 60 lbf/100 ft$^2$, or from 40 lbf/100 ft$^2$ to 55 lbf/100 ft$^2$ when measured immediately after preparation of the cement composition and before substantial curing has taken place, such as within 20 minutes of preparing the cement composition. The 10-second gel strength and 10-minute gel strength of the cement compositions may be determined according to the test methods subsequently described in this disclosure.

Before any substantial curing has taken place (such as within less than 20 minutes after preparing the cement composition), the cement composition may have a fluid loss of from 0 to 400 cubic centimeters per 30 minutes (cm$^3$/30 min) measured according to the test methods provided subsequently in this disclosure. In embodiments, prior to curing the cement composition, the free fluid of the cement composition may be less than or equal to 10%, less than or equal to 5%, less than or equal to 3%, less than or equal to 2%, less than or equal to 1%, or even less than or equal to 0.1% measured according to the test methods provided subsequently in this disclosure. In embodiments, prior to curing the cement compositions, the free fluid of the cement compositions is about 0%.

The cement compositions of the present disclosure may have a thickening time of greater than or equal to 4 hours according to the test methods provided subsequently in this disclosure. In embodiments, the cement compositions may have a thickening time of from 4 hours to 48 hours, from 4 hours to 24 hours, from 4 hours to 12 hours, or from 4 hours to 8 hours. The cement compositions of the present disclosure may have a cure time of from 4 hours to 48 hours according to the test methods provided subsequently in this disclosure. In embodiments, the cement compositions may have a cure time of from 4 hours to 48 hours, from 4 hours to 40 hours, from 4 hours to 35 hours, from 4 hours to 30 hours, from 4 hours to 25 hours, from 4 hours to 24 hours, from 4 hours to 20 hours, from 4 hours to 15 hours, from 4 hours to 12 hours, from 4 hours to 10 hours, from 4 hours to 8 hours, from 6 hours to 48 hours, from 6 hours to 40 hours, from 6 hours to 35 hours, from 6 hours to 30 hours, from 6 hours to 25 hours, from 6 hours to 24 hours, from 6 hours to 20 hours, from 6 hours to 15 hours, from 6 hours to 12 hours, from 6 hours to 10 hours, or from 6 hours to 8 hours.

As previously discussed, embodiments of the present disclosure are directed to methods for cementing a tubular string in a wellbore by dispensing the cement composition of the present disclosure into an annulus of the wellbore (wellbore annulus 22, casing-casing annulus 32, or both in FIG. 1) and allowing the cement composition to cure in the annulus to form a cured cement. The cement composition may include a cement precursor, water, and the cement retarder of the present disclosure, where the cement retarder includes a hydrocarboxylic acid derivative. Strong chelation of alpha and beta hydrocarboxylic groups of the hydrocarboxylic acid derivatives may cause the hydrocarboxylic acid derivatives to more easily adsorb onto the surfaces of calcium containing hydration products, thereby inhibiting further hydration or reaction of the hydration products.

Referring again to FIG. 1, the methods for cementing wellbores 10, may include dispensing the cement composition into the wellbore annulus 22 defined between the tubular string 20 and the wellbore wall 16 of the wellbore 10, between two tubular strings 20 positioned in the wellbore 10, or both. The cement composition may include a cement precursor, water, and the cement retarder comprising the hydrocarboxylic acid derivative. The cement precursor, water, and the cement retarder may have any of the features, compositions, or characteristics subsequently described for these constituents of the cement composition. The method may further include allowing the cement composition to cure in the annulus (wellbore annulus 22, casing-casing annulus 32, or both) to form a cured cement. The methods may further include preparing the cement composition. The method may further include mixing the cement composition to obtain a homogeneous mixture.

Prior to preparing the cement composition and dispensing the cement composition into the annulus 22, 32, the method may include drilling the wellbore 10, placing the tubular string 20 in the wellbore 10, or both. Dispensing the cement composition into the annulus 22, 32 may include dispensing (such as by pumping) the cement composition into the fluid conduit 18 defined by an interior surface 26 of the tubular string 20, wellbore wall 16, or both and dispensing a displacement fluid into the fluid conduit 18 after the cement composition such that the displacement fluid displaces the cement composition from the fluid conduit 18 into the annulus, such as the wellbore annulus 22, casing-casing annulus 32, or both. The displacement fluid may be pumped into the fluid conduit 18 of the tubular string 20 downhole from an uphole plug (not shown) to force the cement composition to the downhole end of the tubular string 20, around the downhole edge of the tubular string 20, and into the annulus 22, 32. A displacement fluid may also be referred to as a flush fluid. The displacement fluid may be pumped into the fluid conduit 18 of the tubular string 20 until all of the cement composition is disposed within the annulus 22, 32. Cooperation of a downhole plug and the uphole plug may operate to maintain the cement composition in the annulus 22, 32.

In embodiments, the cement compositions may include one or more constituents that may be at least partially incompatible with drilling fluids or other treatment fluids present in the wellbore 10 when installing the tubular strings 20. When the cement composition includes constituents incompatible with drilling or treatment fluids already present in the wellbore 10, the method may further include dispensing a spacer fluid into the fluid conduit 18, the wellbore 10, or both, before dispensing the cement composition into the wellbore 10. The spacer fluid may provide a buffer between the drilling fluid or treatment fluid and the cement composition to prevent contact between incompatible constituents. Various washing fluids or pre-flush fluids may also be introduced to the interior volume of the tubular string 20 before or after the spacer fluid. Washing fluids may be used to remove films and residue from the surfaces of the tubular string 20 and wellbore wall. A fixed amount of the cement composition may then be pumped into the internal volume of the tubular string 20 after the spacer fluid. The fixed amount of the cement composition may be an amount that fills the annulus, such as the wellbore annulus 22, casing-casing annulus 32, or both. A downhole plug may be used between the spacer fluid and cement composition, and an uphole plug may be inserted after the cement composition.

The cement compositions may be used for sealing the annulus or remediating a wellbore 10 under a range of different downhole conditions in the wellbore. The cement compositions may be adapted to different downhole conditions by changing the concentrations of the cement retarder, weighting materials, or other additives in the cement composition to modify the specific gravity, viscosity, mechanical properties, curing time, or other properties of the cement composition.

The cement composition may then be allowed to cure to form a barrier between the tubular string 20 and the wellbore 10, between the tubular string 20 and an outer tubular string 20, or both. The cement retarder may reduce the curing rate and increase the cure time to allow all of the cement composition to be dispensed into the annulus 22, 32 before curing of the cement composition, particularly at temperatures greater than or equal to 50° C., or even greater than or equal to 100° C. When the cement composition cures, the cement composition may physically and chemically bond with both the exterior surface 24 of the tubular string 20 and the wellbore wall 16 or interior surface 26 of the outer casing surrounding the tubular string 20, coupling the tubular string 20 to the wellbore wall 16 or the outer casing. This fluid isolation does not permit fluid migration through the cement composition to the interior of the well or up-hole to the surface 12.

In addition to primary sealing, remedial sealing may be performed using the cement compositions of the present disclosure. In remedial sealing, the cement composition may be introduced to specific locations within the wellbore 10 to repair the wellbore 10, such as to repair sections of the wellbore in which micro-cracks have formed in the annuli or in which increased casing-casing annulus pressure has caused damage to the tubular strings 20. Remedial sealing may also include injecting the cement composition into the wellbore 10 for purposes of sealing the wellbore 10 in preparation for abandonment or for controlling water production from the subterranean formation. In some situations, remedial sealing may include the process of "squeezing," in which the cement composition is forced against the inner surface of the portion of the well to be remediated, such as the inner surface of the innermost tubular string. As the cement composition is forced against the inner surface of the tubular string or wellbore wall, liquid portions of the cement composition may be "squeezed" into the microcracks, or into the formation in the case of remediating the wellbore wall.

TEST METHODS

Viscosity

The viscosity of the cement compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet (lbf/100 ft$^2$). The viscometer may also be used to measure the shear rate of the cement compositions.

Gel Strength

The gel strength refers to the shear stress of the cement composition measured at a reduced shear rate following a defined period of time during which the cement composition is maintained in a static state. The shear stress of the composition at reduced shear rate may be measured using a standard oilfield viscometer, such as a FANN® Model 35 viscometer operated at reduced rotations per minute ("rpms"), such as at 3 rpm, according to the test methods described in API Recommended Practice On Determining the Static Gel Strength of Cement Formulations (RP 10B-6/ISO 10426-6:2008). To measure the gel strength, the cement composition is first stirred by contacting the composition with the spindle of the viscometer and operating the viscometer at 600 rotations per minute (rpm). The viscometer is then turned off for period of time (time period). For a 10-second gel strength the time period is 10 seconds, and for a 10-minute gel strength the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the cement composition is reported in units of pounds of force per 100 square feet (lbf/100 ft$^2$).

Rheology

The rheology of the cement compositions may be modeled based on Bingham plastic flow behavior. In particular, the cement compositions may behave as a rigid body at lesser shear stress but flow as a viscous fluid at greater shear stress. The rheological behavior of the cement compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the cement compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the cement compositions, and a lesser PV is preferred. The PV of the cement compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 2 (EQU. 2), which is subsequently provided. The PV values determined for the cement compositions are provided in this disclosure in units of centipoise (cP).

$$PV = (\text{viscosity at 600 rpm}) - (\text{viscosity at 300 rpm}) \quad \text{EQU. 2}$$

At shear stress less than the YP of the cement composition, the cement composition behaves as a rigid body, and at shear stress greater than the YP of the cement composition, the cement composition flows as a viscous fluid. In other words, the YP represents the amount of stress required to move a fluid from a static condition. The YP is determined by extrapolating the Bingham plastic rheology model to a shear rate of zero. The YP of the cement composition may be estimated from the PV from EQU. 2 by subtracting the PV from the shear stress measured at 300 rpm according to Equation 3 (EQU. 3), which is provided subsequently.

$$YP = (300 \text{ rpm reading}) - PV \quad \text{EQU. 3}$$

The YP is expressed as a force per area, such as pounds of force per one hundred square feet (lbf/100 ft$^2$) for example. The methods for measuring and determining PV and YP for the cement compositions are consistent with methods conventionally used for drilling fluids in general.

Fluid Loss Test

API fluid loss is a test that measures the static filtration behavior of the cement slurry at ambient temperature and 100-psi differential pressure. The fluid loss of the cement compositions may be measured according to test methods provided in the API Recommended Practice For Cementing (RP 10B).

Free Fluid API Test

Free fluid, which is also known as "free water," is the percent volume of fluid that separates from a cement slurry when the slurry is left static. The free fluid can be measured according to test methods provided in the API Recommended Practice For Cementing (RP 10B).

Thickening Time Test

Thickening time is a measurement of the time a cement slurry remains in a fluid state and is capable of being pumped. To assess thickening time, downhole conditions are simulated by plotting the consistency of the slurry over time at the anticipated temperature and pressure conditions. The consistency of the slurry is measured in Bearden Consistency units (Bc), which are a dimensionless quantity on a scale from 1 to 100. At levels greater than 50 Bc, pumping begins to become difficult, and at 100 Bc, the cement slurry is completely set.

EXAMPLES

The following examples illustrate one or more features of the present disclosure. It should be understood that these examples are not intended to limit the scope of the disclosure or the appended claims in any manner. In these Examples and Comparative Examples, Table 1 provides the composition for class G cement utilized as the cement precursor in the cement compositions in these Examples and cement compositions of the Comparative Examples.

TABLE 1

| Composition of Class G Cement | |
|---|---|
| Constituent | Mass % |
| Silica (SiO$_2$) | 21 |
| Alumina (Al$_2$O$_3$) | 3.5 |
| Iron Oxide (Fe$_2$O$_3$) | 3.9 |
| Calcium Oxide, Total (TCaO) | 62.3 |
| Magnesium Oxide (MgO) | 4.4 |
| Sulphur Trioxide (SO$_3$) | 2.8 |
| Loss on Ignition | 1 |
| Equivalent Alkali (as Na$_2$O) | 0.54 |
| C$_3$S | 57 |
| C$_2$S | 17.3 |
| C$_3$A | 2.5 |
| C$_4$AF | 12 |
| C$_4$AF + 2X C$_3$A | 17 |
| CSH$_{0.5}$ | 3.8 |

Comparative Example 1: Commercially Available Cement Retarder

A commercially available cement retarder was analyzed in Comparative Example 1. The commercially available cement retarder of Comparative Example 1 was a sodium lignosulfonate cement retarder available from Schlumberger Limited. The cement retarder of Comparative Example 1 included aromatic groups with sodium lignosulfonate. The main component in the cement retarder was sodium polynaphthalene sulfonate polymer as shown in the following chemical formula (III).

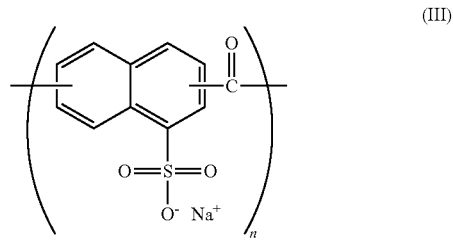

(III)

Figure 8:
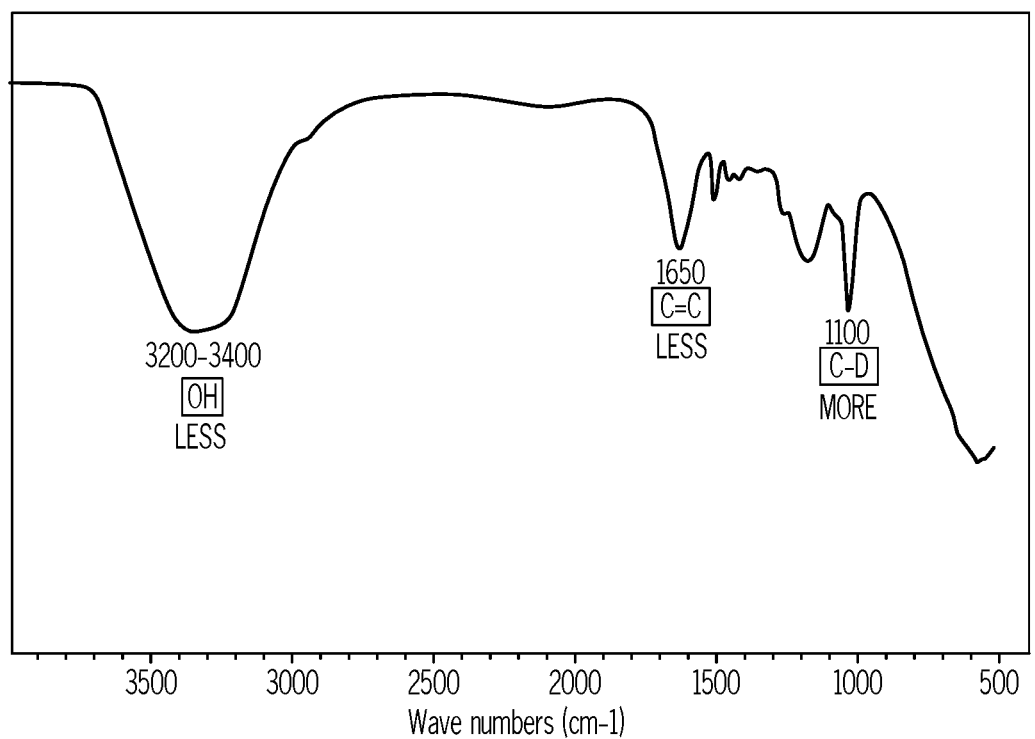
FIG. 8 graphically depicts a Fourier Transformed Infrared (FTIR) spectroscopy spectrum for the comparative commercially-available cement retarder of FIG. 3, according to the prior art.

The commercially available cement retarder of Comparative Example 1 was found to have a specific gravity of from 1.24 to 1.26 at 27° C. Referring to FIG. 3, a 1H Nuclear Magnetic Resonance (NMR) spectrum for the cement retarder of Comparative Example 1 is graphically depicted. The NMR spectrum in FIG. 2 shows a peak at 7 ppm 1H chemical shift, which indicates a proton from aromatic group in the commercially available cement retarder of Comparative Example 1. Referring to FIG. 8, the Fourier Transform Infrared Analysis (FTIR) spectrum for the commercially available cement retarder of Comparative Example 1 is graphically depicted. The commercially available cement retarder of Comparative Example 1 had negligible alkali content.

Example 2: Cement Retarder Comprising Hydrocarboxylic Acid Derivative

In Example 2, a cement retarder comprising 70 wt. % to 90 wt. % of hydrocarboxylic acid derivatives according to the present disclosure was prepared. The hydrocarboxylic acid derivatives in the cement retarder of Example 2 consisted mainly of sodium gluconate (sodium salt of gluconic acid). The cement retarder further comprised 1 to 5 wt. % of nonyl phenol condensate, 1 to 5 wt. % of sulphonated naphthalene formaldehyde (SNF powder), and less than 1 wt. % of formaldehyde.

The cement retarder of Example 2 had a specific gravity of from 1.16 to 1.5 at 20° C. and an alkali content (alkalinity), which was represented by $Na_2O$, of less than 5.0 grams per liter.

Referring now to FIG. 3, the $_1H$ NMR spectrum for the cement retarder of Example 2 is graphically depicted. The $_1H$ NMR spectrum of FIG. 3 shows several peaks in intensity in the 1H chemical shift between 4.5 and 5.0 ppm, which indicates the presence of a lignosulfonate chemical or functional group. However, the $_1H$ NMR spectrum of FIG. 3 also shows differences in the composition of the cement retarder of Example 2 compared to the commercially available cement retarder of Comparative Example 1. In particular, the $_1H$ NMR spectrum of FIG. 3 shows that the cement retarder of Example 2 has more unsaturated compounds compared to the commercially available cement retarder of Comparative Example 1. Further, the peaks in intensity in the range of 3-4 ppm for the cement retarder of Example 2 indicates the presence of —$OCH_3$ groups and isolated sulfur groups, which are not observed in the commercially available cement retarder of Comparative Example 1.

Referring to FIG. 5, the $_1H$ NMR spectrum for sodium D-gluconate is graphically depicted. Comparison of FIG. 4 to FIG. 5 shows that the $_1H$ NMR spectrum for the cement retarder of Example 2 includes the peaks indicative of sodium D-gluconate. Thus, FIG. 4 confirms that the cement retarder of Example 2 includes sodium D-gluconate, which is not present in the commercially available cement retarder of Comparative Example 1.

Figure 9:
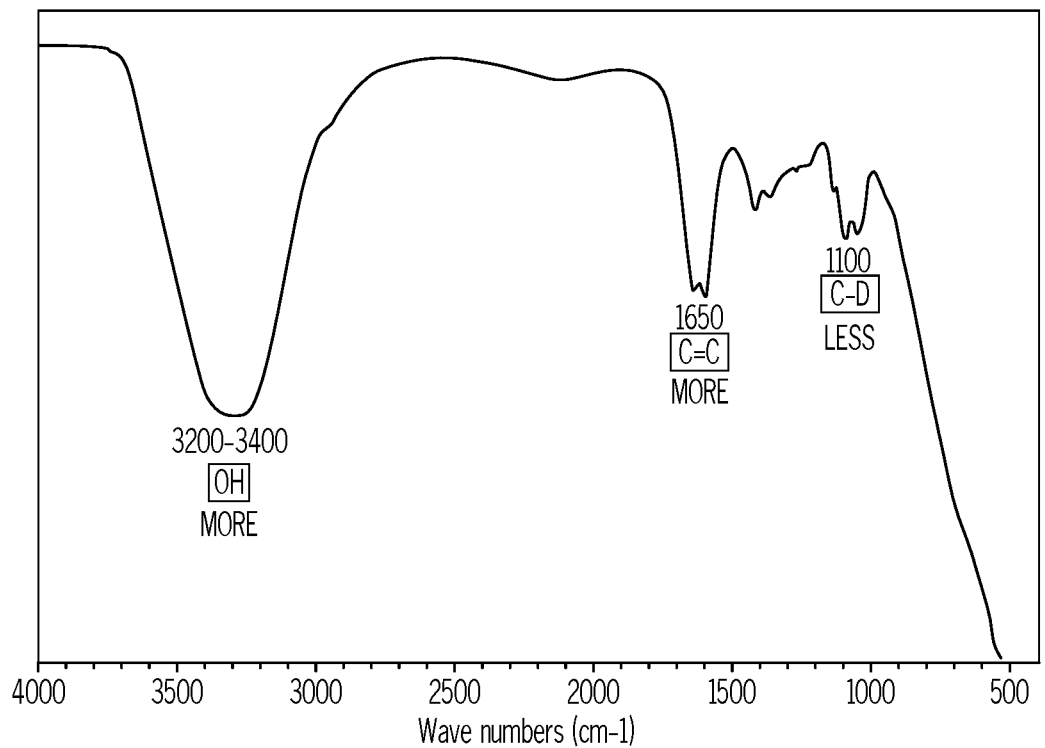
FIG. 9 graphically depicts an FTIR spectrum for the cement retarder comprising hydrocarboxylic acid derivatives of FIG. 4, according to one or more embodiments shown and described in the present disclosure.

Referring now to FIG. 9, the FTIR spectrum for the cement retarder of Example 2 is graphically depicted and shows some intensity differences compared to the FTIR spectrum for the commercially available cement retarder of Comparative Example 1 in FIG. 8. The size of the FTIR peaks in FIGS. 8 and 9 shows the amount of bond existing in the material. In FIGS. 8 and 9, the large peak between 3200 $cm^{-1}$ and 3400 $cm^{-1}$ indicates the existence of a hydroxyl group (OH). In FIG. 9, the peak was more intense, which means that the cement retarder of Example 2 includes more hydroxyl groups compared to the cement retarder of Comparative Example 1. In addition, the peak at 1650 $cm^{-1}$ indicates the existence of C═C (double bond between two carbon atoms), and shows that the cement retarder of Example 2 includes more double bond compared to the cement retarder of Comparative Example 1.

Figure 10:
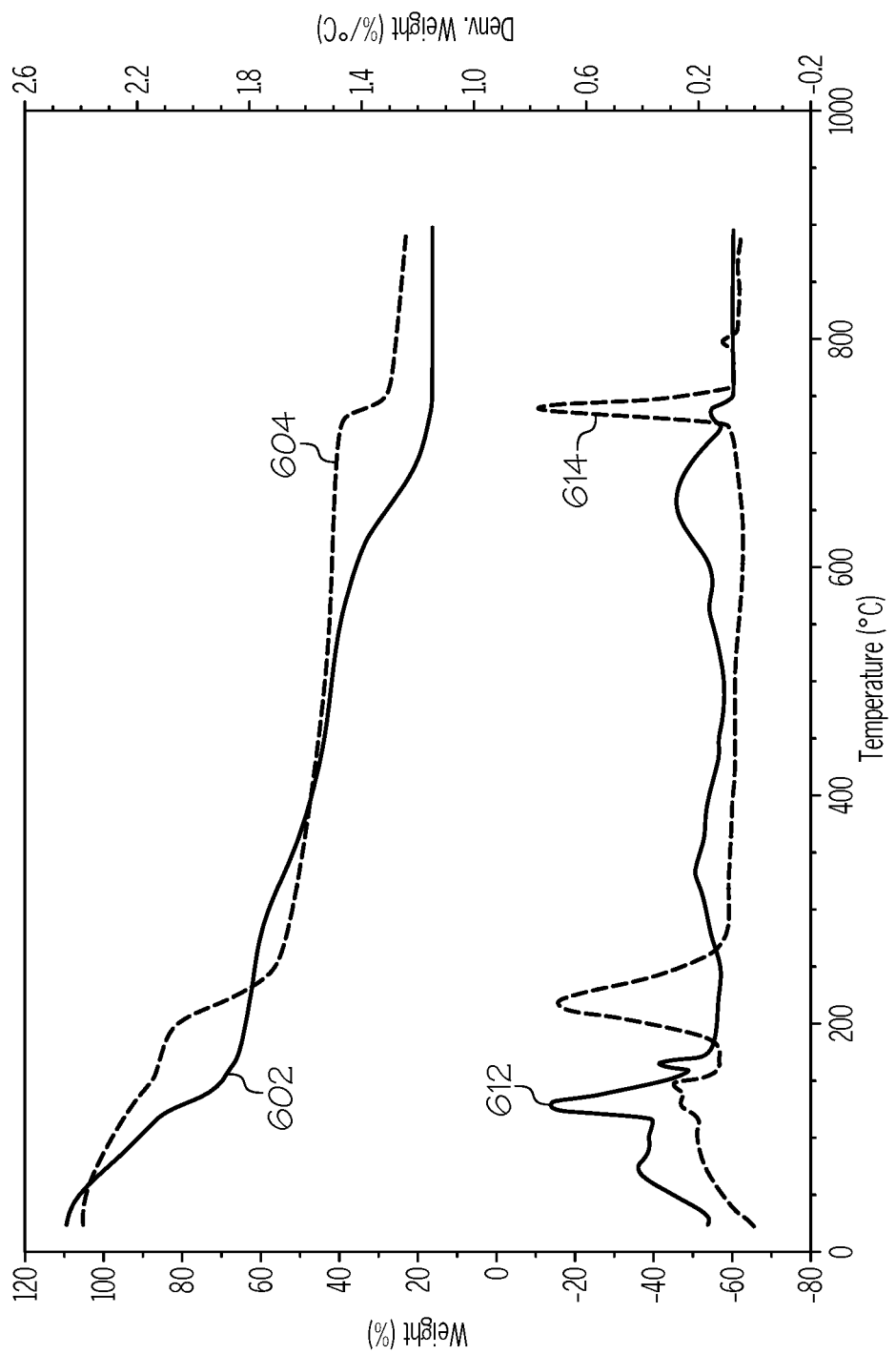
FIG. 10 graphically depicts Thermogravimetric Aanalysis (TGA) for the comparative commercially-available cement retarder of FIG. 3 and the cement retarder comprising hydrocarboxylic acid derivatives of FIG. 4, according to one or more embodiments shown and described in the present disclosure.

Referring now to FIG. 10, Thermogravimetric analysis (TGA) of the cement retarder of Example 2 (reference nos. 604 and 614) and the commercially available cement retarder of Comparative Example 1 (reference nos. 602 and 612) are graphically depicted. From the TGA results in FIG. 10, the conclusion can be drawn that the cement retarder of Example 2 has good thermal stability. In particular, the cement retarder of Example 2 is shown to be stable at temperatures of from 0° C. to 400° C. and the weight loss did not exceed 50% over the temperature range of 0° C. to 400° C. These results indicate that the cement retarder of Example 2 is suitable for use in the downhole conditions, such as at high temperatures greater than or equal to 50° C. or even greater than or equal to 100° C. and high pressures greater than or equal to 25 MPa or even greater than or equal to 30 MPa.

Comparative Example 3: Cement Composition without the Cement Retarder

In Comparative Example 3, a cement composition was prepared from the class G cement of Table 1, water, and a few drops of defoamer. No cement retarder was included in the cement composition of Comparative Example 3. The formula for the cement composition of Comparative Example 3 is provided in Table 2.

Comparative Example 4: Cement Composition with Commercially Available Cement Retarder of Comparative Example 1

In Comparative Example 4, a cement composition was prepared from the class G cement of Table 1, water, a few drops of defoamer, and the commercially available cement retarder of Comparative Example 1. The amount of water in the cement composition of Comparative Example 4 was adjusted to account for the added cement retarder to maintain the density of the cement composition the same as the comparative cement of Comparative Example 3, which was a density of 118 pcf (1890 $kg/m^3$). The formula for the cement composition of Comparative Example 4 is provided in Table 2.

Example 5: Cement Composition with Cement Retarder

For Example 5, a cement composition was prepared to include the cement retarder comprising the hydrocarboxylic acid derivatives. The cement composition of Example 5 included the class G cement of Table 1, water, a few drops of defoamer, and the cement retarder of Example 2 comprising the hydrocarboxylic acid derivatives. The amount of water in the cement composition of Example 5 was adjusted to account for the added cement retarder to maintain the density of the cement composition the same as the comparative cement of Comparative Example 3, which was a density of 118 pcf (1890 $kg/m^3$). The formulation for the cement composition of Example 5 are provided in Table 2.

Thickening Time Test for Comparative Examples 3 and 4 and Example 5

The cements of Comparative Examples 3 and 4 and the cement composition of Example 5 were subjected to thickening time tests conducted in accordance with the test methods previously described in the present disclosure. The thickening time tests were all conducted immediately after preparing the compositions and mixing the compositions for 5 minutes.

The thickening time tests were conducted under conditions simulating downhole temperature and pressure conditions using a high temperature high pressure (HTHP) consistometer obtained from Chandler Engineering. Each cement composition was introduced to the HTHP consistometer, and the temperature and pressure of the cement composition was gradually increased over a period of 30 minutes. The temperature of the cement compositions was increased to a final temperature of 126 degrees Fahrenheit (° F.) (52° C.) to simulate a bottom hole circulating temperature (BHCT) of 126° F. (52° C.), and the pressure was ramped up to a final pressure of 5200 pounds per square inch (psi) (35.9 MPa).

Figure 11:
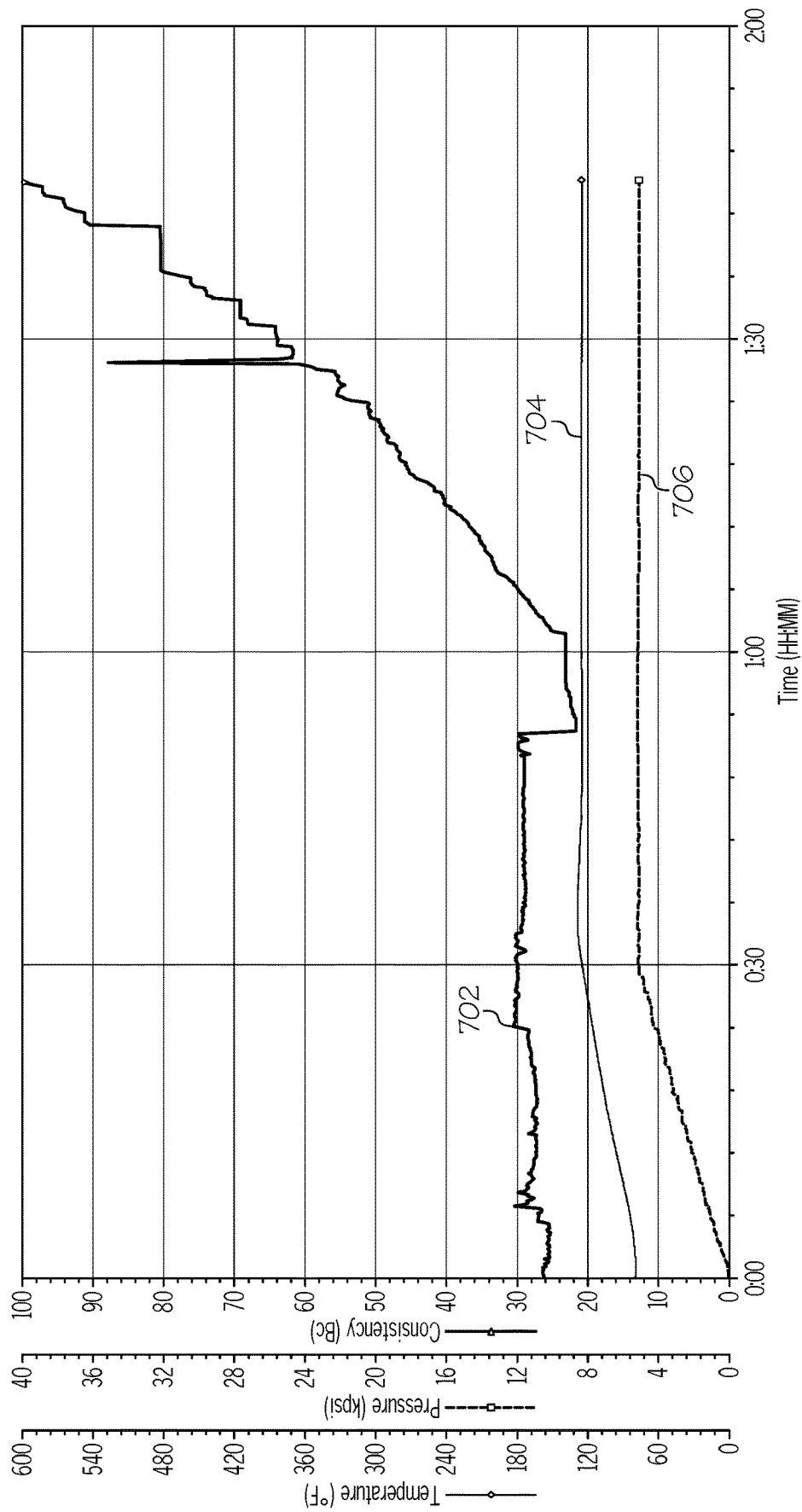
FIG. 11 graphically depicts the temperature, pressure, and Bearden consistency (y-axis) as a function of time (x-axis) for a cement composition with no cement retarder, according to one or more embodiments shown and described in the present disclosure.
Figure 12:
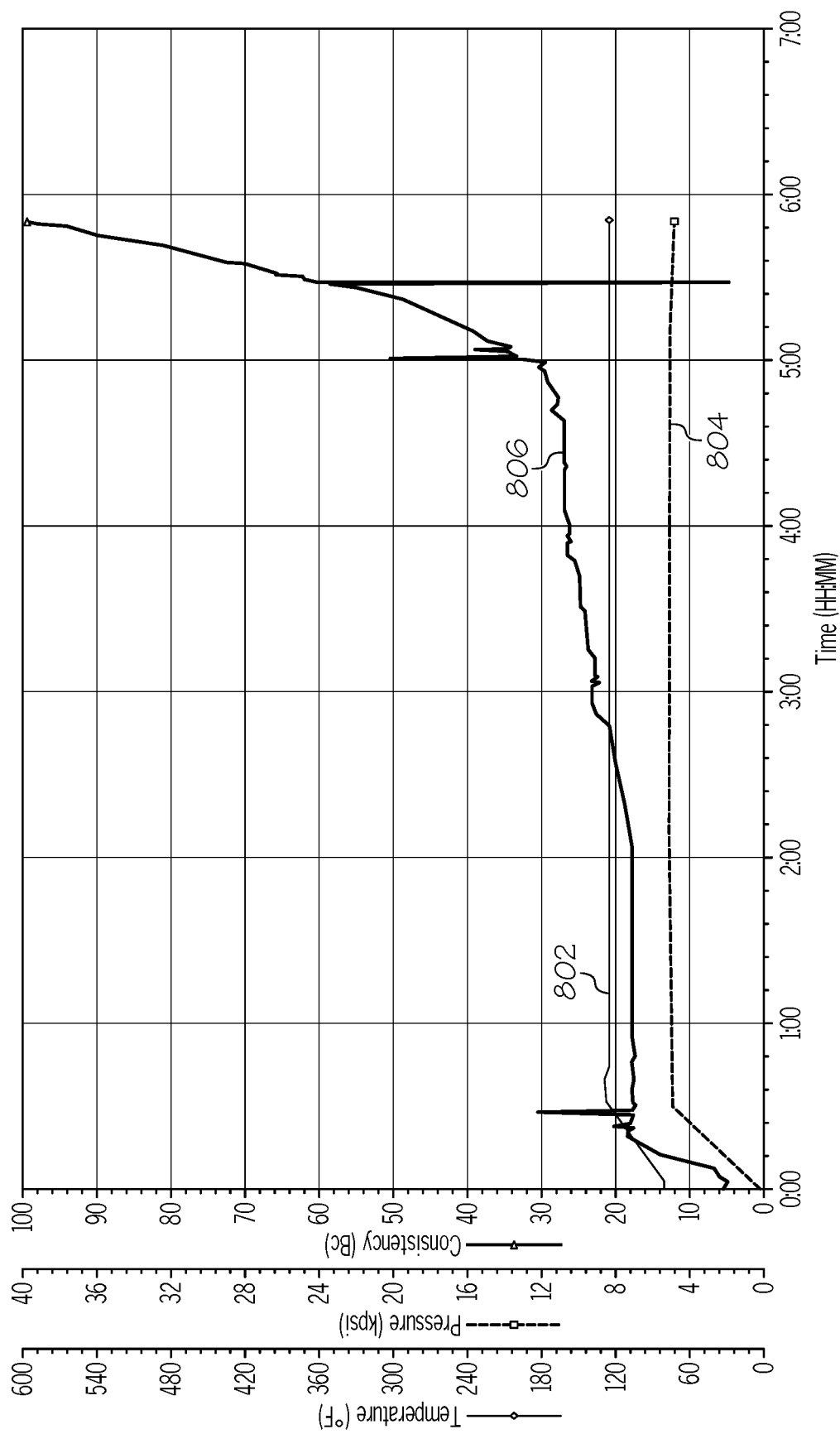
FIG. 12 graphically depicts the temperature, pressure, and Bearden consistency (y-axis) as a function of time (x-axis) for a cement composition comprising having the cement retarder of Example 2 comprising the hydrocarboxylic acid derivatives, according to one or more embodiments shown and described in the present disclosure.
Figure 13:
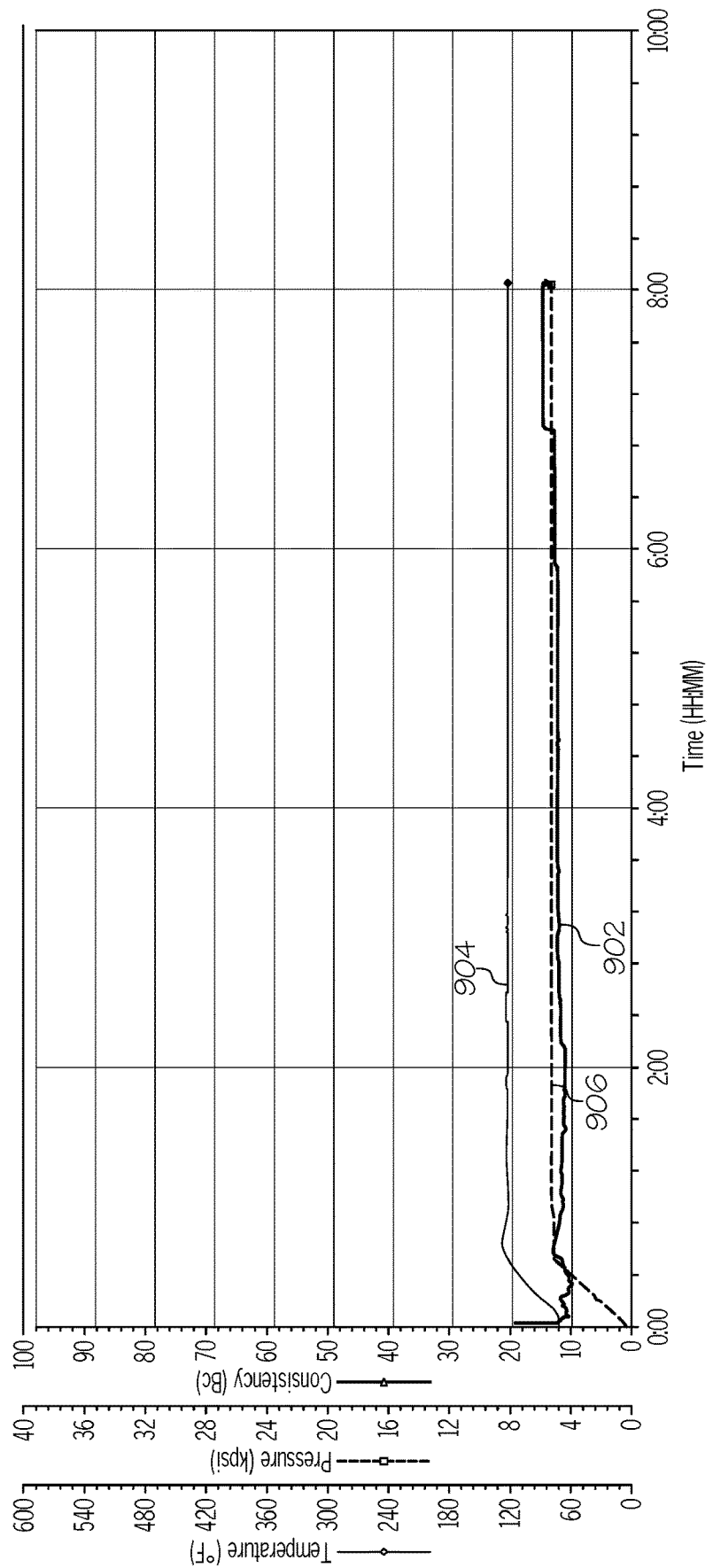
FIG. 13 graphically depicts the temperature, pressure, and Bearden consistency (y-axis) as a function of time (x-axis) during the thickening time test for the cement composition Example 5, according to one or more embodiments shown and described in the present disclosure.

FIG. 11 shows the temperature, pressure, and Bearden consistency, temperature, and pressure (y-axis) as a function of time (x-axis) during the thickening time test for the cement of Comparative Example 3. FIG. 12 shows the temperature, pressure, and Bearden consistency, temperature, and pressure (y-axis) as a function of time (x-axis) during the thickening time test for the cement of Comparative Example 4. FIG. 13 shows the temperature, pressure, and Bearden consistency (y-axis) as a function of time (x-axis) during the thickening time test for the cement composition Example 5. The thickening time and Final Bearden consistency for the cement compositions of Comparative Examples 3 and 4 and Example 5 are provided in Table 2.

TABLE 2

|  | Comparative Example 3 | Comparative Example 4 | Example 5 |
|---|---|---|---|
| Cement Retarder (grams (g)) | — | 8.15 | 8.15 |
| Defoamer | Few drops | Few drops | Few drops |
| Cement Precursor (g) | 800 | 800 | 800 |
| Water (g) | 355.04 | 345.85 | 345.85 |
| Total Weight (g) | 1155.04 | 1154.00 | 1154.00 |
| Density | 118 | 118 | 118 |
| FIG. | 11 | 12 | 13 |
| Thickening Time (hours:minutes) | 1:45 | 5:50 | Greater than 8 hours |
| BC Final | 100 | 100 | N/A* |

Referring to FIG. 11, the Bearden Consistency (BC) 702, temperature 704, and pressure 706 as functions of time for the thickening time test for the cement of Comparative Example 3 are graphically depicted. At the conditions of 52° C. and 5200 psi, the cement of Comparative Example 3 exhibited an increase in Bearden Consistency starting at one hour and a thickening time of 1 hour and 45 minutes. Depending on the application for the cement, the thickening time of the cement of Comparative Example 3 may not be sufficient to deploy all of the cement before the increase in Bearden consistency renders the cement unpumpable.

Referring to FIG. 12, the Bearden Consistency (BC) 802, temperature 804, and pressure 806 as functions of time for the thickening time test for the cement of Comparative Example 4 are graphically depicted. At the conditions of 52° C. and 5200 psi, the cement of Comparative Example 4 exhibited an increase in Bearden Consistency starting at about 3 hours and then increasing dramatically starting at about 5 hours. The thickening time of the cement of Comparative Example 4 was found to be 5 hours and 50 minutes. While increasing the thickening time compared the cement of Comparative Example 3 without a cement retarder, the thickening time of 5 hours and 50 minutes for the cement of Comparative Example 3 may still not be sufficient, depending on the application and downhole conditions, to deploy all of the cement before the increase in Bearden consistency renders the cement unpumpable.

Referring to FIG. 13, the Bearden Consistency 902, temperature 904, and pressure 906 as functions of time for the thickening time test for the cement composition of Example 5 are graphically depicted. As shown by FIG. 13, the Bearden Consistency (BC) of the cement composition of Example 5 was generally constant throughout the testing period of 8 hours, which indicates that the addition of the cement retarder of Example 2 to the cement composition, as in the cement composition of Example 5, increases the cure time to greater than 8 hours. The cure time of the cement composition of Example 5 was observed to be greater than 8 hours. The increase in the cure time may enable deployment of the cement composition before the onset of thickening, in particular at temperatures greater than or equal to 50° C.

Further, as shown by FIGS. 12 and 13, the cement composition of Example 5 has shown a straight line on the graphs compare to the cement of Comparative Example 4. This shows that the cement composition of Example 5 has a strong retardation effect. An increasing or a peak in FIG. 12 indicates that the cement of Comparative Example 4 has a weaker retarding effect. Not to be limited by any particular theory, it is believed that due to withdrawing of calcium ion ($Ca^{2+}$) in the cement composition and existing of more of unsaturated compounds with the attached sulfur group, which is electron donating group, the cement composition of Example 5 has a retarder that is more reactive and has a strong retarding effect on the setting time of cement slurry compared to the cement compositions of Comparative Examples 3 and 4.

Example 6: Cement Composition with Cement Retarder and Additives 1

For Example 6, a cement composition was prepared to include the cement retarder comprising the hydrocarboxylic acid derivatives. The cement composition of Example 6 included the class G cement of Table 1, water, defoamer, the cement retarder of Example 2 comprising the hydrocarboxylic acid derivatives, and additives. The additives included dispersants and fluid loss additives. The amount of water in the cement composition of Example 6 was adjusted to account for the added cement retarder to maintain the density of the cement composition the same as the comparative cement of Comparative Example 3, which was a density of 118 pcf (1890 kg/m$^3$). The formulation for the cement composition of Example 6 are provided in Table 3.

Example 7: Cement Composition with Cement Retarder and Additives 2

For Example 7, a cement composition was prepared to include the cement retarder comprising the hydrocarboxylic acid derivatives. The cement composition of Example 7 included the class G cement of Table 1, water, defoamer, the cement retarder of Example 2 comprising the hydrocarboxylic acid derivatives, and additives. The additives included silica flour, expansion additives, fluid loss additives, latex, and latex stabilizer. The amount of water in the cement composition of Example 7 was adjusted to account for the added cement retarder to maintain the density of the cement composition the same as the comparative cement of Comparative Example 3, which was a density of 118 pcf (1890 kg/m$^3$). The formulation for the cement composition of Example 7 are provided in Table 3.

Example 8: Cement Composition with Cement Retarder and Additives 3

For Example 8, a cement composition was prepared to include the cement retarder comprising the hydrocarboxylic acid derivatives. The cement composition of Example 8 included the class G cement of Table 1, water, defoamer, the cement retarder of Example 3 comprising the hydrocarboxylic acid derivatives, and additives. The additives included silica flour, expansion additives, dispersant, latex, and latex stabilizer. The amount of water in the cement composition of Example 8 was adjusted to account for the added cement retarder to maintain the density of the cement composition the same as the comparative cement of Comparative Example 3, which was a density of 118 pcf (1890 kg/m$^3$). The formulation for the cement composition of Example 8 are provided in Table 3.

Thickening Time Test for Examples 6-8

The cements of Examples 6-8 were subjected to thickening time tests conducted in accordance with the test methods previously described in the present disclosure. The thickening time tests were all conducted immediately after preparing the compositions and mixing the compositions for 5 minutes.

The thickening time tests were conducted under conditions simulating downhole temperature and pressure conditions using a high temperature high pressure (HTHP) consistometer obtained from Chandler Engineering. Each cement composition was introduced to the HTHP consistometer, and the temperature and pressure of the cement composition was gradually increased over a period of 30 minutes.

Figure 14:
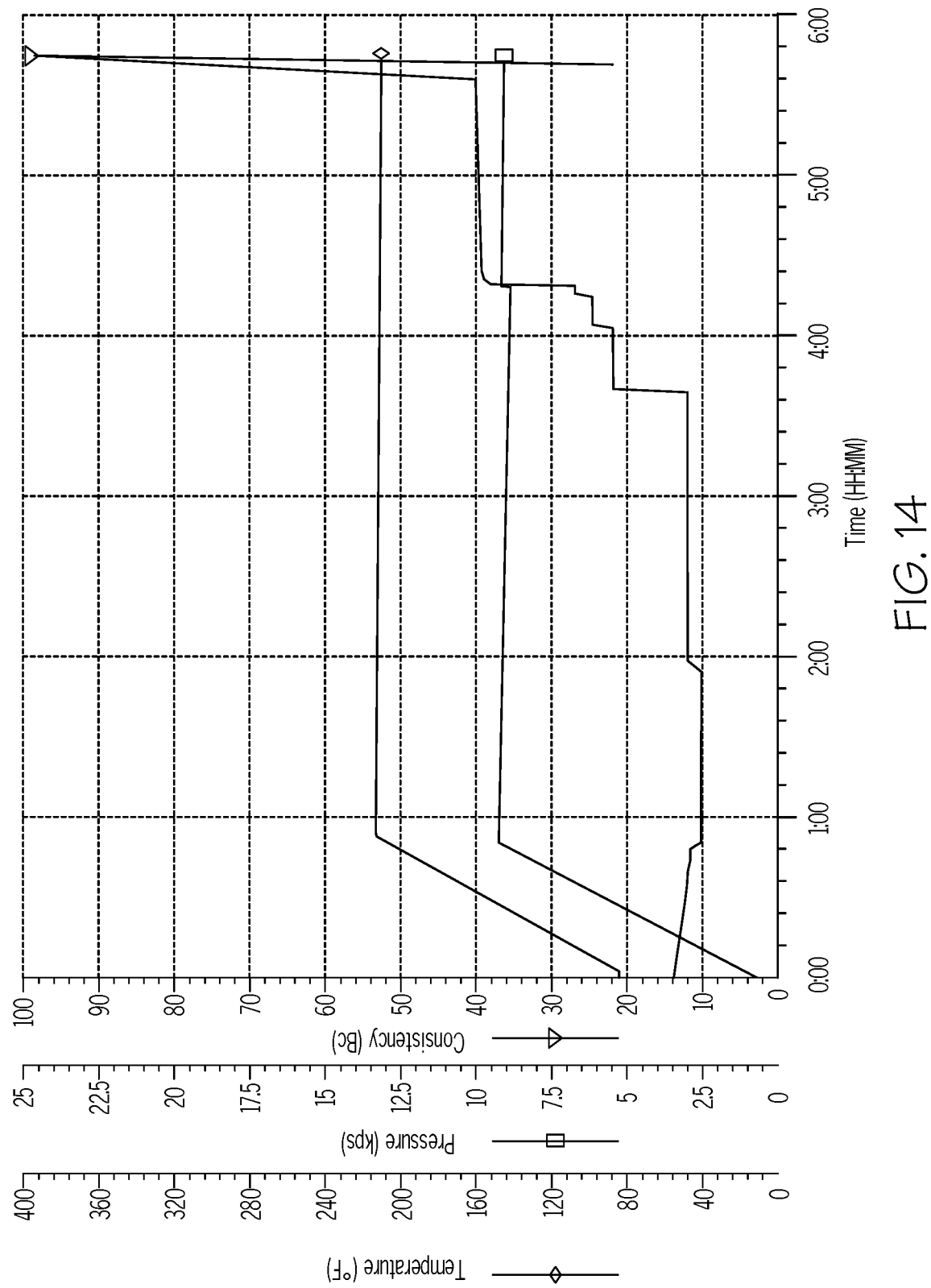
FIG. 14 graphically depicts the temperature, pressure, and Bearden consistency (y-axis) as a function of time (x-axis) during the thickening time test for the cement composition Example 6, according to one or more embodiments shown and described in the present disclosure.
Figure 15:
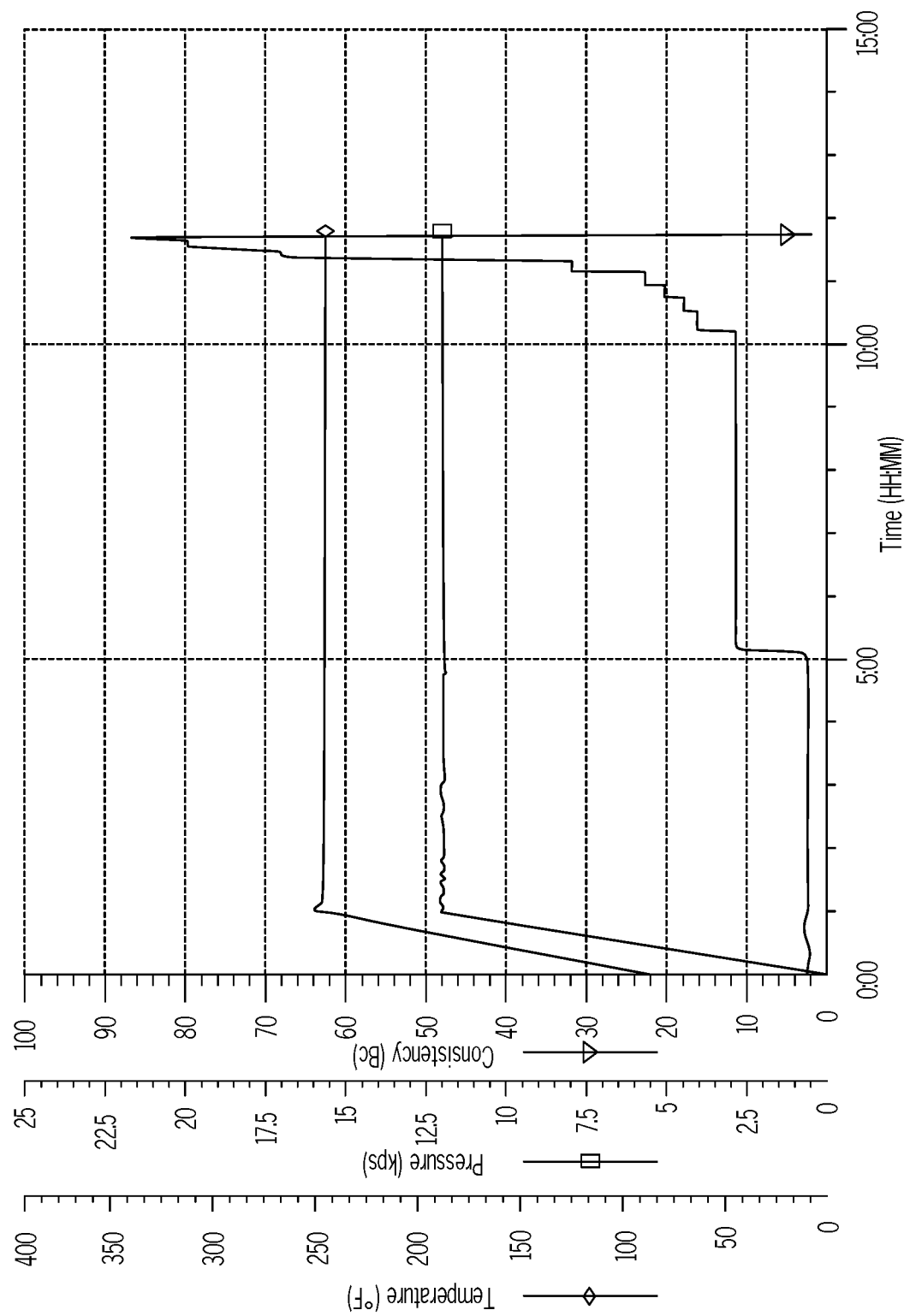
FIG. 15 graphically depicts the temperature, pressure, and Bearden consistency (y-axis) as a function of time (x-axis) during the thickening time test for the cement composition Example 7, according to one or more embodiments shown and described in the present disclosure.
Figure 16:
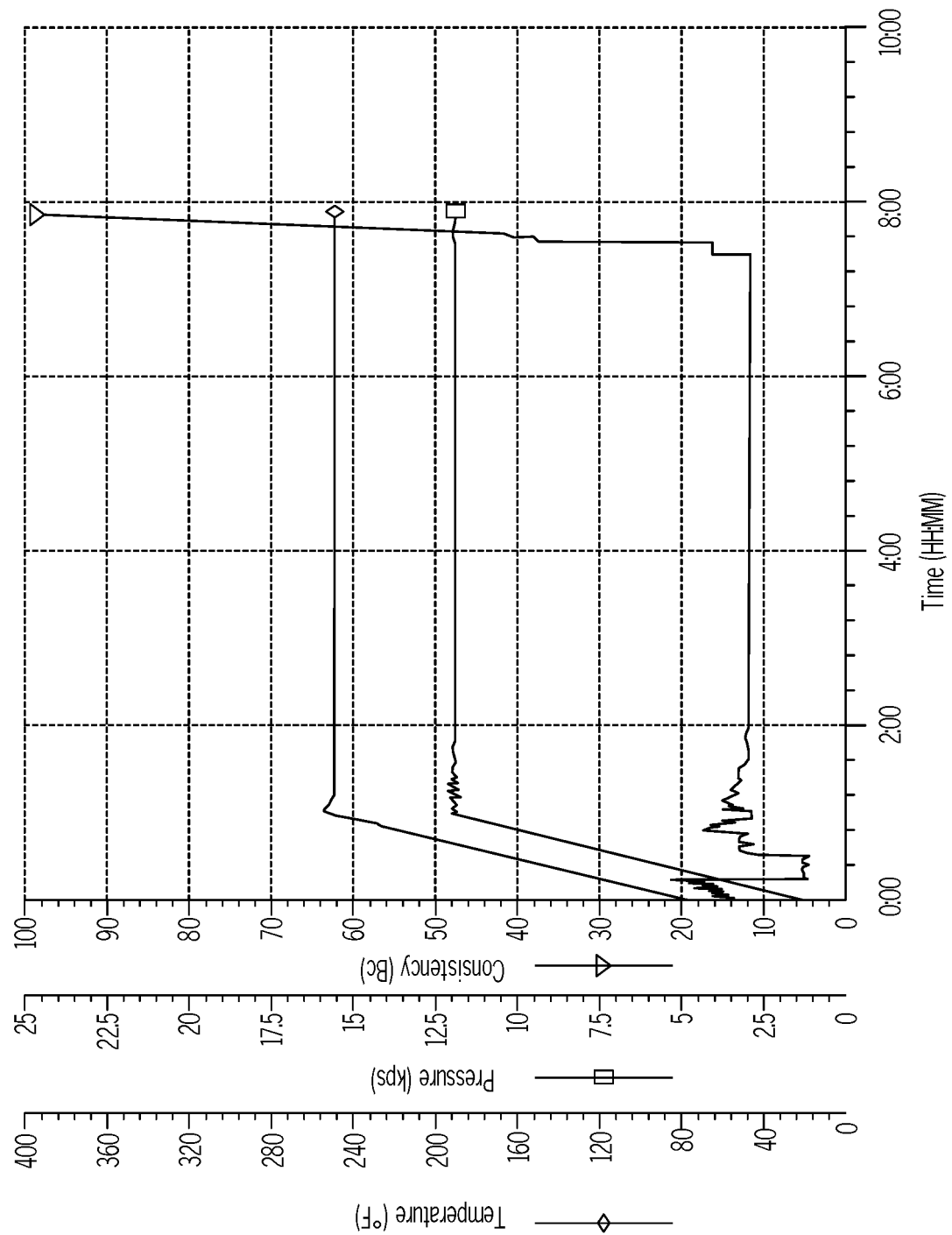
FIG. 16 graphically depicts the temperature, pressure, and Bearden consistency (y-axis) as a function of time (x-axis) during the thickening time test for the cement composition Example 8, according to one or more embodiments shown and described in the present disclosure.

FIG. 14 shows the temperature, pressure, and Bearden consistency, temperature, and pressure (y-axis) as a function of time (x-axis) during the thickening time test for the cement of Example 6. FIG. 15 shows the temperature, pressure, and Bearden consistency, temperature, and pressure (y-axis) as a function of time (x-axis) during the thickening time test for the cement of Example 7. FIG. 16 shows the temperature, pressure, and Bearden consistency (y-axis) as a function of time (x-axis) during the thickening time test for the cement composition Example 8. The thickening time and Final Bearden consistency for the cement compositions of Examples 6-8 are provided in Table 3.

TABLE 3

|  | Example 6 | | Example 7 | | Example 8 | |
| --- | --- | --- | --- | --- | --- | --- |
|  | Special Gravity | Concentration | Special Gravity | Concentration | Special Gravity | Concentration |
| Cement Retarder | 1.1580 | 0.070 gps | 1.1580 | 0.900 gps | 1.1580 | 1.0 gps |
| Defoamer | 0.9950 | 0.005 gps | 0.9950 | 0.05 gps | 0.9950 | 0.05 gps |
| Trifunction | 1.2633 | 0.45% BWOC | — | — | — | — |
| Fluid Loss Additives | 1.4157 | 0.70% BWOC | 1.4157 | 0.40% BWOC | — | — |
| Dispersant | 1.1712 | 0.10% BWOC | — | — | 1.1712 | 0.15% BWOC |
| Silica Flour | — | — | 2.6960 | 35.00% BWOC | 2.6960 | 35.00% BWOC |
| Expansion agent | — | — | 3.62 | 1% BWOC | 3.62 | 1% BWOC |
| Latex | — | — | 1.0180 | 1.5 gps | 1.0180 | 1.5 gps |
| Latex stabilizer | — | — | 1.0350 | 0.15 gps | 1.0350 | 0.15 gps |
| Cement Precursor | 3.2201 | 100% BWOC | 3.19 | 100% BWOC | 3.19 | 100% BWOC |
| Water (gps) | 5.078 | | 4.107 | | 2.714 | |
| Total Weight (g) | 1201.38 | | 1134.10 | | 1134.11 | |
| Density (pcf) | 118 | | 118 | | 125 | |
| FIG. | 14 | | 15 | | 16 | |
| Thickening Time (hours:minutes) | 5:44 | | 11:41 | | 7:53 | |
| BC Final | 100 | | 100 | | 100 | |
| BHST (Bottomhole Static Temperature) | 260° F. (126.7° C.) | | 300° F. (148.9° C.) | | 300° F. (148.9° C.) | |
| BHCT (Bottomhole Circulating Temperature) | 210° F. (98.9° C.) | | 250° F. (121.1° C.) | | 250° F. (121.1° C.) | |
| Simulated BHCT API | 210° F. (98.9° C.) | | 250° F. (121.1° C.) | | 250° F. (121.1° C.) | |
| Initial temperature | 80° F. (26.7° C.) | | 80° F. (26.7° C.) | | 80° F. (26.7° C.) | |
| Time BHC | 50 min | | 60 min | | 60 min | |
| Initial Pressure | 750 psi (5.17 MPa) | | 1000 psi (6.89 MPa) | | 1000 psi (6.89 MPa) | |
| Final Pressure | 9000 psi (62.05 MPa) | | 12000 psi (82.74 MPa) | | 12000 psi (82.74 MPa) | |
| Final Temperature | 210° F. (98.9° C.) | | 250° F. (121.1° C.) | | 250° F. (121.1° C.) | |
| Initial Consistency | 14 BC | | 3 BC | | 14 BC | |
| POD (Point Of Departure) | 3:36 (hr:min) | | 10:12 (hr:min) | | 7:27 (hr:min) | |

TABLE 3-continued

| | Example 6 | | Example 7 | | Example 8 | |
|---|---|---|---|---|---|---|
| | Special Gravity | Concentration | Special Gravity | Concentration | Special Gravity | Concentration |
| 30 BC thickening time | 4:18 (hr:min) | | 11:10 (hr:min) | | 7:35 (hr:min) | |
| 70 BC thickening time | 5:41 (hr:min) | | 11:29 (hr:min) | | 7:46 (hr:min) | |
| 100 BC thickening time | 5:44 (hr:min) | | 11:41 (hr:min) | | 7:53 (hr:min) | |

Rheology, Free Fluid Test, Fluid Loss Test, and Compressive Strength Test for Examples 6-8

The cements of Examples 6-8 were subjected to rheology, free fluid, fluid loss, compressive strength tests conducted in accordance with the test methods previously described in the present disclosure and the results have shown in Table 4.

TABLE 4

| | Example 6 | | | Example 7 | | | Example 8 | | |
|---|---|---|---|---|---|---|---|---|---|
| | colspan Rheology Data | | | | | | | | |
| RT | UP | Down | Average | UP | Down | Average | UP | Down | Average |
| 300 rpm | 295 | 295 | 295 | 155 | 155 | 155 | 181 | 181 | 181 |
| 200 rpm | 230 | 224 | 227 | 113 | 114 | 113.5 | 131 | 136 | 133.5 |
| 100 rpm | 131 | 124 | 127.5 | 69 | 67 | 68 | 79 | 81 | 80 |
| 60 rpm | 87 | 81 | 84 | 48 | 46 | 47 | 57 | 58 | 57.5 |
| 30 rpm | 49 | 45 | 47 | 33 | 30 | 31.5 | 39 | 39 | 39 |
| 6 rpm | 12 | 10 | 11 | 13 | 14 | 13.5 | 18 | 18 | 18 |
| 3 rpm | 6 | 6 | 6 | 11 | 12 | 11.5 | 14 | 16 | 15 |
| Gel 10 seconds | | 6 | | | 12 | | | 16 | |
| Gel 10 minutes | | 7 | | | 25 | | | 28 | |
| Plastic viscosity (Cp) | | 294.2 | | | 143.8 | | | 165.8 | |
| Yield Point (lbf/100 ft$^2$) | | 16.7 | | | 15.8 | | | 20.8 | |
| 190° F. | UP | Down | Average | UP | Down | Average | UP | Down | Average |
| 300 rpm | 222 | 222 | 222 | 170 | 170 | 170 | 161 | 161 | 161 |
| 200 rpm | 164 | 158 | 161 | 135 | 124 | 129.5 | 123 | 125 | 124 |
| 100 rpm | 99 | 89 | 94 | 90 | 85 | 8735 | 82 | 80 | 81 |
| 60 rpm | 68 | 55 | 61.5 | 65 | 60 | 62.5 | 62 | 60 | 61 |
| 30 rpm | 39 | 30 | 34.5 | 42 | 38 | 40 | 45 | 41 | 43 |
| 6 rpm | 10 | 6 | 8 | 13 | 11 | 12 | 20 | 20 | 20 |
| 3 rpm | 6 | 5 | 5.5 | 9 | 8 | 8.5 | 14 | 17 | 15.5 |
| Gel 10 seconds | | 5 | | | 9 | | | 19 | |
| Gel 10 minutes | | 8 | | | 19 | | | 31 | |
| Plastic viscosity (Cp) | | 217.7 | | | 159.1 | | | 143.4 | |
| Yield Point (lbf/100 ft$^2$) | | 11.8 | | | 21.0 | | | 25.9 | |
| Free Fluid | | | | | | | | | |
| Slurry Volume (ml) | | 250 | | | 250 | | | 250 | |
| Temperature (° F.) | | 190 (87.8° C.) | | | 190 (87.8° C.) | | | 190 (87.8° C.) | |
| Test Angle (degrees) | | 0 | | | 0 | | | 0 | |
| % Free Fluid | | 0 | | | 0 | | | 0 | |
| Fluid Loss Test | | | | | | | | | |
| Temperature | | 210° F. (98.9° C.) | | | 250° F. (121.1° C.) | | | 250° F. (121.1° C.) | |
| Collected Filtrate | | 95 | | | 54 | | | 41 | |
| Time (min) | | 10 | | | 30 | | | 30 | |
| Calculated FL/API Fluid Loss | | 329 ml/30 min | | | 108 | | | 82 | |

TABLE 4-continued

|  | Example 6 | Example 7 | Example 8 |
|---|---|---|---|
| Compressive Strength Test | | | |
| Initial Temperature (° F.) | 80 (26.7° C.) | 80 (26.7° C.) | 250 (121.1° C.) |
| Test Pressure (psi) | 3000 (20.68 MPa) | 3000 (20.68 MPa) | 3000 (20.68 MPa) |
| Initial Set 50 psi | 5:35 | 36:10 | 44:47 |
| Time to 500 psi | 6:15 | 40:36 | 50:46 |
| Final CS (psi) | 3373 (23.26 MPa) | 1716 (11.83 MPa) | 3389 (23.3 MPa) |
| Final Temperature (° F.) | 260 (126.7° C.) | 300 (148.9° C.) | 300 (148.9° C.) |
| Time BHC (min) | 50 | 60 | 60 |
| CS at 12:00 hr (psi) | 2750 (18.96 MPa) | — | — |
| Test Time (hr) | 20:00 | 68:00 | 75:30 |

As shown in FIGS. 14-16 and Tables 3-4, the cement retarder was compatible with additives 1-3, because the retarding effect was still observed and the rheology, free fluid, fluid loss, compressive strength of the cements were unaffected.

A first aspect of the present disclosure may be directed to a cement composition comprising from 10 weight percent to 70 weight percent cement precursor based on the total weight of the cement composition; from 5 weight percent to 70 weight percent water based on the total weight of the cement composition; and from 0.1 percent by weight of cement (BWOC) to 10 percent BWOC cement retarder. The cement retarder may comprise a hydrocarboxylic acid derivative.

A second aspect of the present disclosure may include the first aspect, where the cement retarder is chloride free.

A third aspect of the present disclosure may include either one of the first or second aspects, where the hydrocarboxylic acid derivative includes at least one hydroxyl group and at least one carboxyl group.

A fourth aspect of the present disclosure may include any one of the first through third aspects, where the hydrocarboxylic acid derivative comprises an alkali metal or alkaline earth metal salt of gluconic acid.

A fifth aspect of the present disclosure may include any one of the first through fourth aspects, where the hydrocarboxylic acid derivative comprises sodium gluconate.

A sixth aspect of the present disclosure may include any one of the first through fifth aspects, where the cement retarder consists of sodium gluconate.

A seventh aspect of the present disclosure may include any one of the first through sixth aspects, where the cement precursor is API Class G cement.

An eighth aspect of the present disclosure may include any one of the first through seventh aspects, where the cement precursor comprises tricalcium silicate, dicalcium silicate, tricalcium aluminate, and tetracalcium alumina ferrite.

A ninth aspect of the present disclosure may include any one of the first through eighth aspects, where the cement precursor further comprises gypsum.

A tenth aspect of the present disclosure may include any one of the first through ninth aspects, where the cement precursor comprises from 75 wt. % to 85 wt. % silicates based on the total weight of the cement precursor.

An eleventh aspect of the present disclosure may include any one of the first through tenth aspects, where the cement precursor comprises 60 wt. % to 65 wt. % tricalcium silicate and from 1 wt. % to 20 wt. % dicalcium silicate based on the total weight of the cement precursor.

A twelfth aspect of the present disclosure may include any one of the first through eleventh aspects, further comprising from 5 percent BWOC to 50 percent BWOC silica flour.

A thirteenth aspect of the present disclosure may include any one of the first through twelfth aspects, further comprising from 10 percent BWOC to 150 percent BWOC weighting agent.

A fourteenth aspect of the present disclosure may include any one of the first through thirteenth aspects, further comprising: from greater than 0 percent BWOC to less than or equal to 10 percent BWOC expansion additive; from greater than 0 percent BWOC to less than or equal to 5 percent BWOC defoamer; from greater than 0 percent BWOC to less than or equal to 10 percent BWOC latex; and from greater than 0 percent BWOC to less than or equal to 10 percent BWOC latex stabilizer.

A fifteenth aspect of the present disclosure may include any one of the first through fourteenth aspects, where the gel strength of the cement composition has a value greater than or equal to 1 when measured at room temperature and at a speed of 3 rotations per minute (rpm) using the method provided in the API Recommended Practice For Cementing (RP 10B).

A sixteenth aspect of the present disclosure may include any one of the first through fifteenth aspects, where the cement composition has a gel strength greater than or equal to 1 using the method provided in the API Recommended Practice for Cementing.

A seventeenth aspect of the present disclosure may include any one of the first through sixteenth aspects, where the cement composition has a density in a range of from 65 pcf to 180 pcf.

An eighteenth aspect of the present disclosure may include any one of the first through seventeenth aspects, where the cement composition has a cure time of from greater than or equal to 4 hours, or from 4 hours to 48 hours.

A nineteenth aspect of the present disclosure may include any one of the first through eighteenth aspects, where the cement composition has a thickening time of from 4 hours to 48 hours.

A twentieth aspect of the present disclosure may include any one of the first through nineteenth aspects, further comprising: from greater than 0 percent BWOC to 50 percent BWOC silica sand; from 5 percent BWOC to 50 percent BWOC silica flour; and from 10 percent BWOC to 150 percent BWOC weighting agent.

A twenty-first aspect of the present disclosure may include any one of the first through twentieth aspects, further comprising: from greater than 0 percent BWOC to less than or equal to 10 percent BWOC expansion additive; from greater than 0 percent BWOC to less than or equal to 5 percent BWOC defoamer; from greater than 0 percent BWOC to less than or equal to 10 percent BWOC latex; and from greater than 0 percent BWOC to less than or equal to 10 percent BWOC latex stabilizer.

A twenty-second aspect of the present disclosure may be directed to a method for cementing a wellbore, the method comprising: dispensing a cement composition into an annulus defined between a tubular string and an inner wall of a wellbore or between two tubular strings. The cement composition may comprise a cement precursor, water, and from 0.1 percent by weight of cement (BWOC) to 10 percent BWOC cement retarder, and the cement retarder comprises a hydrocarboxylic acid derivative. The method may further comprise allowing the cement composition to cure in the annulus to form a cured cement, where the cement retarder comprising the hydrocarboxylic acid derivative increases the thickening time of the cement composition to greater than or equal to 4 hours at downhole temperatures greater than or equal to 50° C.

A twenty-third aspect of the present disclosure may include the twenty-second aspect, further comprising drilling a portion of a wellbore and placing a tubular string in the wellbore.

A twenty-fourth aspect of the present disclosure may include either one of the twenty-second or twenty-third aspects, further comprising preparing the cement composition.

A twenty-fifth aspect of the present disclosure may include any one of the twenty-second through twenty-fourth aspects, where preparing the cement composition comprises: combining the cement precursor and water to prepare a cement slurry; combining the cement retarder with the cement slurry to produce the cement composition; and mixing the cement composition to obtain a homogeneous mixture.

A twenty-sixth aspect of the present disclosure may include any one of the twenty-second through twenty-fifth aspects, where dispensing the cement composition into the annulus comprises pumping the cement composition into the wellbore and displacing cement composition up into the annulus.

A twenty-seventh aspect of the present disclosure may include any one of the twenty-second through twenty-sixth aspects, where displacing the cement composition up into the annulus comprises pumping a displacement fluid into the wellbore after the cement composition, where the displacement fluid causes the cement composition in the wellbore to flow up into the annulus.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A cement composition comprising:
   from 10 weight percent to 70 weight percent cement precursor based on the total weight of the cement composition, where the cement precursor comprises tricalcium silicate, dicalcium silicate, tricalcium aluminate, and tetracalcium alumina ferrite;
   from 5 weight percent to 70 weight percent water based on the total weight of the cement composition; and
   from 0.1 percent by weight of cement (BWOC) to 10 percent BWOC cement retarder, where the cement retarder comprises a hydrocarboxylic acid derivative that comprises at least one hydroxyl group and at least one carboxyl group.

2. The cement composition of claim 1, where the hydrocarboxylic acid derivative comprises an alkali metal or alkaline earth metal salt of gluconic acid.

3. The cement composition of claim 1, where the hydrocarboxylic acid derivative comprises sodium gluconate.

4. The cement composition of claim 1, where the cement retarder consists of sodium gluconate.

5. The cement composition of claim 1, where the cement precursor is API Class G cement.

6. The cement composition of claim 1, where the cement precursor further comprises gypsum.

7. The cement composition of claim 1, where the cement precursor comprises from 75 wt. % to 85 wt. % silicates based on the total weight of the cement precursor.

8. The cement composition of claim 1, further comprising from 5 percent BWOC to 50 percent BWOC silica flour or from 10 percent BWOC to 150 percent BWOC weighting agent.

9. The cement composition of claim 1, further comprising:
from greater than 0 percent BWOC to less than or equal to 10 percent BWOC expansion additive;
from greater than 0 percent BWOC to less than or equal to 5 percent BWOC defoamer;
from greater than 0 percent BWOC to less than or equal to 10 percent BWOC latex; and
from greater than 0 percent BWOC to less than or equal to 10 percent BWOC latex stabilizer.

10. The cement composition of claim 1, where a gel strength of the cement composition has a value greater than or equal to 1 when measured at room temperature and at a speed of 3 rotations per minute (rpm) using the method provided in the APIRecommended Practice For Cementing (RP 10B).

11. The cement composition of claim 1, where the cement composition has a gel strength greater than or equal to 1 using the method provided in the API Recommended Practice for Cementing.

12. The cement composition of claim 1, where the cement composition has a density in a range of from 65 pcf to 180 pcf, a cure time of from greater than or equal to 4 hours, or both.

13. The cement composition of claim 1, where the cement composition has a thickening time of from 4 hours to 48 hours.

14. The cement composition of claim 1, further comprising:
from greater than 0 percent BWOC to 50 percent BWOC silica sand;
from 5 percent BWOC to 50 percent BWOC silica flour; and
from 10 percent BWOC to 150 percent BWOC weighting agent.

15. The cement composition of claim 1, where:
the hydrocarboxylic acid derivative comprises sodium gluconate, and
the cement precursor further comprises gypsum.

16. A method for cementing a wellbore, the method comprising:
dispensing a cement composition into an annulus defined between a tubular string and an inner wall of a wellbore or between two tubular strings, where:
the cement composition comprises a cement precursor, water, and from 0.1 percent by weight of cement (BWOC) to 10 percent BWOC cement retarder;
the cement retarder comprises a hydrocarboxylic acid derivative that comprises at least one hydroxyl group and at least one carboxyl group; and
the cement precursor comprises tricalcium silicate, dicalcium silicate, tricalcium aluminate, and tetracalcium alumina ferrite; and
allowing the cement composition to cure in the annulus to form a cured cement, where the cement retarder comprising the hydrocarboxylic acid derivative increases the thickening time of the cement composition to greater than or equal to 4 hours at downhole temperatures greater than or equal to 50° C.

17. The method of claim 16, further comprising preparing the cement composition,
where preparing the cement composition comprises:
combining the cement precursor and water to prepare a cement slurry;
combining the cement retarder with the cement slurry to produce the cement composition; and
mixing the cement composition to obtain a homogeneous mixture.

18. The method of claim 16, where the hydrocarboxylic acid derivative comprises an alkali metal or alkaline earth metal salt of gluconic acid.

19. The method of claim 16, where the hydrocarboxylic acid derivative comprises sodium gluconate.

* * * * *

UNITED STATES PATENT AND TRADEMARK OFFICE
CERTIFICATE OF CORRECTION

PATENT NO. : 11,970,423 B2
APPLICATION NO. : 17/543991
DATED : April 30, 2024
INVENTOR(S) : Alkhalaf et al.

It is certified that error appears in the above-identified patent and that said Letters Patent is hereby corrected as shown below:

In the Claims

Column 39, Line 34 (Claim 10): Delete "APIRecommended" and insert -- API Recommended --, therefor.

Signed and Sealed this
Twenty-fifth Day of June, 2024

Katherine Kelly Vidal
*Director of the United States Patent and Trademark Office*